(12) United States Patent
Barthold

(10) Patent No.: US 7,777,458 B2
(45) Date of Patent: Aug. 17, 2010

(54) DC-DC CONVERTER

(76) Inventor: Fred O. Barthold, 9275 Trade Pl., Suite A, San Diego, CA (US) 92126

( * ) Notice: Subject to any disclaimer, the term of this patent is extended or adjusted under 35 U.S.C. 154(b) by 20 days.

(21) Appl. No.: 12/291,993

(22) Filed: Nov. 14, 2008

(65) Prior Publication Data

US 2009/0174376 A1    Jul. 9, 2009

Related U.S. Application Data

(60) Provisional application No. 60/992,194, filed on Dec. 4, 2007, provisional application No. 61/013,187, filed on Dec. 12, 2007.

(51) Int. Cl.
*G05F 1/613* (2006.01)
(52) U.S. Cl. .................. 323/224; 323/232; 323/272
(58) Field of Classification Search .............. 323/224, 323/232, 272
See application file for complete search history.

(56) References Cited

U.S. PATENT DOCUMENTS

| | | | |
|---|---|---|---|
| 3,553,620 | A | 1/1971 | Cielo et al. |
| 5,436,818 | A | 7/1995 | Barthold |
| 6,069,801 | A | 5/2000 | Hodge, Jr. et al. |
| 6,094,038 | A | 7/2000 | Lethellier |
| 6,304,065 | B1 | 10/2001 | Wittenbreder |
| 6,362,986 | B1 | 3/2002 | Schultz et al. |
| 6,515,883 | B2 | 2/2003 | Wade |
| 6,545,450 | B1 | 4/2003 | Ledenev et al. |
| 7,049,786 | B1 | 5/2006 | Toliyat et al. |
| 7,098,648 | B2 | 8/2006 | Krieger et al. |
| 7,183,754 | B2 * | 2/2007 | Tsuruya ...................... 323/272 |
| 7,218,081 | B2 | 5/2007 | Jang et al. |
| 7,602,165 | B2 * | 10/2009 | Watanabe et al. ........... 323/282 |
| 2006/0279970 | A1 | 12/2006 | Kernahan |
| 2007/0103122 | A1 | 5/2007 | Morong et al. |

OTHER PUBLICATIONS

Massey et al., "High Voltage Single-Ended DC-DC Converter", PESC 77, Jun. 1977, Record, p. 159, Table 1.

(Continued)

*Primary Examiner*—Shawn Riley
(74) *Attorney, Agent, or Firm*—Van Pelt, Yi & James LLP

(57) ABSTRACT

A Single Ended Primary Inductance Converter (SEPIC) fed BUCK converter includes: a first switch configured to open or close according to a first signal; a SEPIC portion coupled to the first switch and coupled to an energy source, the SEPIC portion comprising a first set of one or more passive components; a BUCK converter portion coupled to the first switch, the BUCK converter portion comprising a second set of one or more passive components. While the first switch is closed, the SEPIC portion is configured to store energy from an energy source in at least some of the first set of passive components and deliver energy to the BUCK portion, and the BUCK converter portion is configured to deliver energy to a load and to store energy in at least some of the second set of passive components. While the first switch is open, the SEPIC portion is configured to deliver at least some of its stored energy to the load, and the BUCK converter portion is configured to deliver at least some of its stored energy to the load.

25 Claims, 18 Drawing Sheets

OTHER PUBLICATIONS

E. E. Landsman, "A Unifying Derivation of Switching DC-DC Converter Topologies", PESC '79 Record, San Diego, CA, Jun. 18-22, 1979, pp. 239-243.

George Schuellein, "Multiphase Buck Converter Design Responds Well to Transients", http://www.planetanalog.com/printableArticle.hjtml?articleID=12801317, Jun. 20, 2006, pp. 1-13.

John Clarkin, "Design of a 50A Multi-phase Converter", HFPC '99 Proceedings, Ventura, CA, Nov. 1999, pp. 414-420.

Carl Smith, "How to Achieve New Standards in DC-DC Converter Efficiency for Computer Applications", HFPC '99 Proceedings, Ventura, CA, Nov. 1999, pp. 152-158.

Leu et al., "A Novel Forward Configuration for DC-DC Application: Built-in Input Filter Forward Converter (BIFFC)", APEC '95 Proceedings, Dallas, TX, Mar. 5-9, 1995, pp. 43-49.

Wei et al., "A High Efficiency Topology for 12V VRM-Push-Pull Buck and Its Integrated Magnetics Implementations", APEC 2002 Proceedings, Dallas, TX, Mar. 10-14, 2002, pp. 679-685.

Xu et al., "Investigation of Candidate Topologies for 12V VRM", APEC 2002 Proceedings, Dallas, TX, Mar. 10-14, 2002, pp. 686-692.

Yao et al. "Tapped-Inductor Buck Converters with a Lossless Clamp Circuit", APEC 2002 Proceedings, Dallas, TX, Mar. 10-14, 2002, pp. 693-698.

Ye et al. "Investigation of Topology Candidates for 48V VRM", APEC 2002 Proceedings, Dallas, TX, Mar. 10-14, 2002, pp. 699-705.

Takagi et al. "Ultra High Efficiency of 95% for DC/DC Converter—Considering Theoretical Limitation of Efficiency", APEC 2002 Proceedings, Dallas, TX, Mar. 10-14, 2002, pp. 735-741.

Abu-Qahouq et al. "Novel Transient Cancellation Control Method for Future Generation of Microprocessors", APEC 2002 Proceedings, Dallas, TX Mar. 10-14, 2002, pp. 216-222.

Yao et al., "Optimal Design of the Active Droop Control Method for the Transient Response", APEC 2003 Proceedings, Miami Beach, FL, Feb. 9-13, 2003, pp. 718-723.

Wei et al. "A Novel Soft-Switched High-Frequency, High-Efficiency, High-Current 12V Voltage Regulator—The Phase-Shift Buck Converter", APEC 2003 Proceedings, Miami Beach, FL, Feb. 9-13, 2003, pp. 724-730.

Tolle et al., "De-Embedding of Reverse Recovery Losses in Fast Switching VRM Applications", APEC 2003 Proceedings, Miami Beach, FL, Feb. 9-13, 2003, pp. 958-963.

Chen et al., Integration of Electromagnetic Passive Components in DPS Front-End DC/DC Converter—A Comparative Study of Different Integration Steps, APEC 2003 Proceedings, Miami Beach, FL, Feb. 9-13, 2003, pp. 1137-1142.

Zumel et al., "Magnetic Integration for Interleaved Converters", APEC 2003 Proceedings, Miami Beach, FL, Feb. 9-13, 2003, pp. 1143-1149.

Jensen et al., "Optimal Core Dimensional Ratios for Minimizing Winding Loss in High-Frequency Gapped-Inductor Windings", APEC 2003 Proceedings, Miami Beach, FL, Feb. 9-13, 2003, pp. 1164-1169.

Yao et al., "A Family of Buck-Type DC-DC Converters with Autotransformers", APEC 2003 Proceedings, Miami Beach, FL, Feb. 9-13, 2003, pp. 114-120.

Li et al., "Using Coupled Inductors to Enhance Transient Performance of Multi-Phase Buck Converters", APEC 2004 Proceedings, Anaheim, CA, Feb. 22-26, 2004, pp. 1289-1293.

Zhao et al., "Characterization of Cdv/dt Induced Power Loss in Synchronous Buck DC-DC Converters", APEC 2004 Proceedings, Anaheim, CA, Feb. 22-26, 2004, pp. 292-297.

Ren et al., "Analysis of the Power Delivery Path from the 12 V VR to the Microprocessor", APEC 2004 Proceedings, Anaheim, CA, Feb. 22-26, 2004, pp. 285-291.

Thomas et al., "Federal Purchasing: Leading the Market for Low Standby Products", APEC 2004 Proceedings, Anaheim, CA, Feb. 22-26, 2004, pp. 318-322.

Narveson et al., "Why the Market is Ready for a Non-Isolated DC/DC Power Module Standard", APEC 2004 Proceedings, Anaheim, CA, Feb. 22-26, 2004, pp. 335-341.

Gaboriault et al., "A High Efficiency, Non-Inverting, Buck-Boost DC-DC Converter", APEC 2004 Proceedings, Anaheim, CA, Feb. 22-26, 2004, pp. 1411-1415.

Edward Herbert, "Analysis of the Near Zero Input Current Ripple Condition in a Symmetrical Push-Pull Converter", HFPC 1989 Proceedings, Naples, FL, May 14-17, 1989, pp. 357-371.

John D. Repp, "Ultra Fast Isolated Gate Drive Circuit", HFPC 1989 Proceedings, Naples, FL, May 14-17, 1989, pp. 438-445.

Prentice et al., "High Frequency, Low Cost Gate Drive Integrated Circuit", HFPC 1991 Proceedings, Toronto, Ontario, Canada, Jun. 9-14, 1991, pp. 72-80.

Laszlo Balogh, "Design and Application Guide for High Speed MOSFET Gate Drive Circuits", Texas Instruments, 2002, pp. 2-1 to 2-39.

Sawle et al., "A Proprietary New Source Mounted Power Package for Board Mounted Power", International Rectifier. Europe 2001.

Pavier et al., "Understanding the Effect of Power MOSFET Package Parasitics on VRM Circuit Efficiency at Frequencies above 1 MHz.", PCIM Europe 2003.

Yang et al., "Effect and Utilization of Common Source Inductance in Synchronous Rectification", APEC 2005 Proceedings, Austin, TX, Mar. 6-10, 2005, pp. 1407-1411.

Yang et al., "A Novel Nonisolated Half Bridge DC-DC Converter", APEC 2005 Proceedings, Austin, TX, Mar. 6-10, 2005, pp. 301-307.

Michael G. Laflin, "How to Simplify Switch-Mode DC-DC Converter Design", CMP Media LLC. Sep. 27, 2006.

Qiu et al., "High-Bandwidth Designs for Voltage Regulators with Peak-Current Control", APEC 2006 Proceedings, Dallas, TX, Mar. 19-23, 2006, pp. 24-30.

Wang et al, "Active Transient Voltage Compensator Design for VR Load Line Improvement", APEC 2006 Proceedings, Dallas, TX, Mar. 19-23, 2006, pp. 59-64.

Alan Elbanhawy, "Buck Converter Losses Under the Microscope", Power Electronics Technology, Feb. 2005, pp. 24, 26-30, 32.

"Comparison of SEPIC and Buck EMI", Fairchild Power Seminar 2006 Presentation Guide, p. 3-17.

Ray Ridley, California Power Research Modeling of BPS4 Topology, Revised Aug. 17, 2000.

E. Stanford, "New Processors Will Require New Powering Technologies", Power Electronics Technology, Feb. 2002, p. 40.

Michael J. Johnson, "Improvement of Stability in Current-Programmed Sepic DC/DC Converters", APEC '91 Conference Proceedings, Dallas, TX, Mar. 10-15, 1991, pp. 452-458.

Severns et al., "Modern DC-to-DC Switchmode Power Converter Circuits", Van Nostrand Reinhold Company, New York, NY, 1985, p. 159.

L. H. Dixon, "The Right-Half-Plane Zero—A Simplified Explanation", Unitrode Switching Regulator Power Supply Design Seminar Manuel (SEM-500), Lexington, MA, 1986, p. C2-1.

"Switching Power Supply Topology Review", Unitrode Switching Regulated Power Supply Design Seminar Manual (SEM-500), Lexington, MA, 1986, p. C3-8.

Steve Mappus, "Predictive Gate Drive Frequently Asked Questions", Texas Instruments Application Report, SLUA285—Feb. 2003.

TPS28225, "High-Frequency 4-A Sink Synchronous MOSFET Driver", SLUS710 May 2006, Texas Instruments, www.TI.com.

Yousefzadeh et al, "Minimum Phase Response in Digitally Controlled Boost and Flyback Converters", APEC 2007 Proceedings, Anaheim, CA, Feb. 28-Mar. 1, 2007, pp. 865-893.

\* cited by examiner

SEPIC FED BUCK (GC)

SEPIC FED BUCK (GC)

SEPIC FED BUCK (GC)

$E_{CCOM1} = E_{CCOM2} = (E_{IN} + E_{OUT})/2$ $E_{CCOM3} = (E_{IN} - E_{OUT})/2$

SEPIC FED BUCK (GC)
COMMUTATION MATRIX

SYNCHRONOUS BUCK

SEPIC FED BUCK

SEPIC FED BUCK (MC)

SEPIC FED BUCK (MC)

SEPIC FED BUCK (MC)

$E_{C_{COM1}} = E_{C_{COM2}} = (E_{IN} + E_{OUT})/2$
SEPIC FED BUCK (MC)
COMMUTATION MATRIX
(INDUCTIVE PARASITICS)

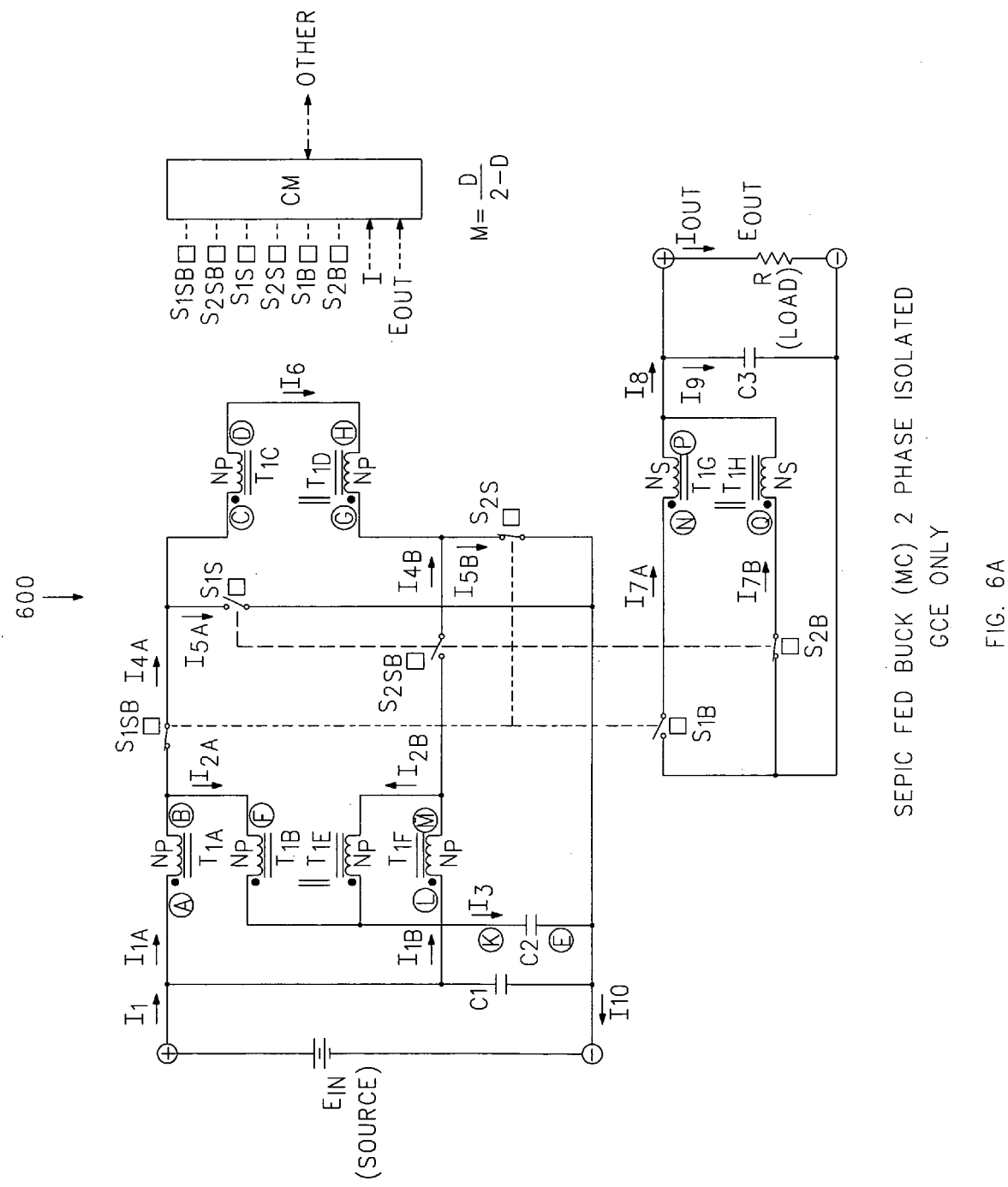
FIG. 6A SEPIC FED BUCK (MC) 2 PHASE ISOLATED GCE ONLY

SEPIC FED BUCK (MC) 2 PHASE ISOLATED GCE ONLY

FIG. 7A SEPIC FED BUCK (MC) GCE ONLY

SEPIC FED BUCK (MC)
GCE ONLY

BUCK

1. BUCK CORE AREA = SEPIC FED BUCK CORE AREA
2. BUCK WINDOW AREA = SEPIC FED BUCK WINDOW AREA
3. BUCK TURNS (2N) = SEPIC FED BUCK TURNS (2N)
4. AREA TERMS ARE DIMENSIONALLY IDENTICAL

SEPIC FED BUCK (GC)

1. BUCK CORE AREA = SEPIC FED BUCK CORE AREA
2. BUCK WINDOW AREA = SEPIC FED BUCK WINDOW AREA
3. BUCK TURNS (2N) = SEPIC FED BUCK TURNS (2N)
4. AREA TERMS ARE DIMENSIONALLY IDENTICAL

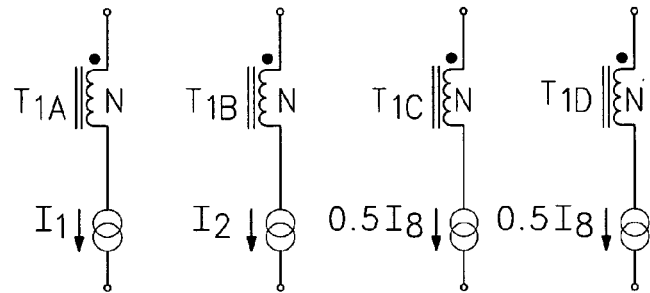

SEPIC FED BUCK (MC)

1. BUCK CORE AREA = SEPIC FED BUCK CORE AREA
2. BUCK WINDOW AREA = SEPIC FED BUCK WINDOW AREA
3. BUCK TURNS (2N) = SEPIC FED BUCK TURNS (2N)
4. AREA TERMS ARE DIMENSIONALLY IDENTICAL

FIG. 8C

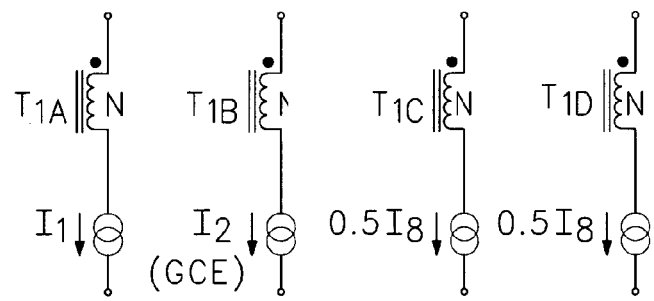

SEPIC FED BUCK (MC)
GCE ONLY

1. BUCK CORE AREA = SEPIC FED BUCK CORE AREA
2. BUCK WINDOW AREA = SEPIC FED BUCK WINDOW AREA
3. BUCK TURNS (2N) = SEPIC FED BUCK TURNS (2N)
4. AREA TERMS ARE DIMENSIONALLY IDENTICAL

SFB(GC): $K=2(1-D+D^2)/(2-D)^2$

SFB(MC): $K=(2-0.5D)/(2-D)^2$

SFB(MC) GCE ONLY: $K=(2-0.5D)/(2-D)^2$

DC-DC CONVERTER

CROSS REFERENCE TO OTHER APPLICATIONS

This application claims priority to U.S. Provisional Patent Application No. 60/992,194 entitled METHOD AND APPARATUS FOR POWER CONVERSION filed Dec. 4, 2007 which is incorporated herein by reference for all purposes; and claims priority to U.S. Provisional Patent Application No. 61/013,187 entitled METHOD AND APPARATUS FOR POWER CONVERSION filed Dec. 12, 2007 which is incorporated herein by reference for all purposes.

BACKGROUND OF THE INVENTION

Modern electronic devices often require power conversion. For example, battery operated devices such as notebook computers and mobile phones often include microprocessors that require the batteries to supply low voltages and high currents. BUCK converter is a type of step-down converter often used in DC-DC power conversion applications. FIG. 1 is a schematic diagram illustrating a conventional BUCK converter. BUCK converter 100 is sometimes referred to as a synchronized BUCK converter because switches $S_{1B}$ and $S_{2B}$ are synchronized to alternately turn on or off.

Conversion efficiency and transient response are important parameters of step-down converters. Conversion efficiency determines how much power is lost during power conversion; transient response determines how quickly the converter can respond to load current or source voltage changes. In the conventional topology shown in FIG. 1, it is often difficult to both increase conversion efficiency and improve transient response since switch and parasitic losses are directly proportional to the switch mode frequency, while the value of the integrating inductor $L_{BUCK}$ determines the first order transient response and is inversely proportional.

BRIEF DESCRIPTION OF THE DRAWINGS

Various embodiments of the invention are disclosed in the following detailed description and the accompanying drawings.

FIG. 6A is a schematic diagram illustrating an embodiment of a multi-phase magnetically coupled, single magnetic SFB converter with attendant voltage, current, and transfer function (M) identities.

FIG. 7A is a schematic diagram illustrating another embodiment of a SFB converter.

FIGS. 8A-8D illustrate the inductive windings in a conventional BUCK converter and in several SFB converters, with attendant current identities and dimensional expressions.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of a Single Ended Primary Inductance Converter (SEPIC) fed BUCK (SFB) converter are disclosed. The converter includes a SEPIC portion that is galvanically or magnetically coupled to a BUCK converter portion. The SEPIC portion and the BUCK converter portion share a switch. While the switch is closed, the SEPIC portion is configured to store energy from an energy source and to deliver energy to the BUCK converter portion, and the BUCK converter portion is configured to deliver energy it receives from the SEPIC portion to the load and to store energy. While the switch is open, the SEPIC portion is configured to deliver at least some of its stored energy to the load, and the BUCK converter portion is configured to deliver at least some of its stored energy to the load.

Figure 1:
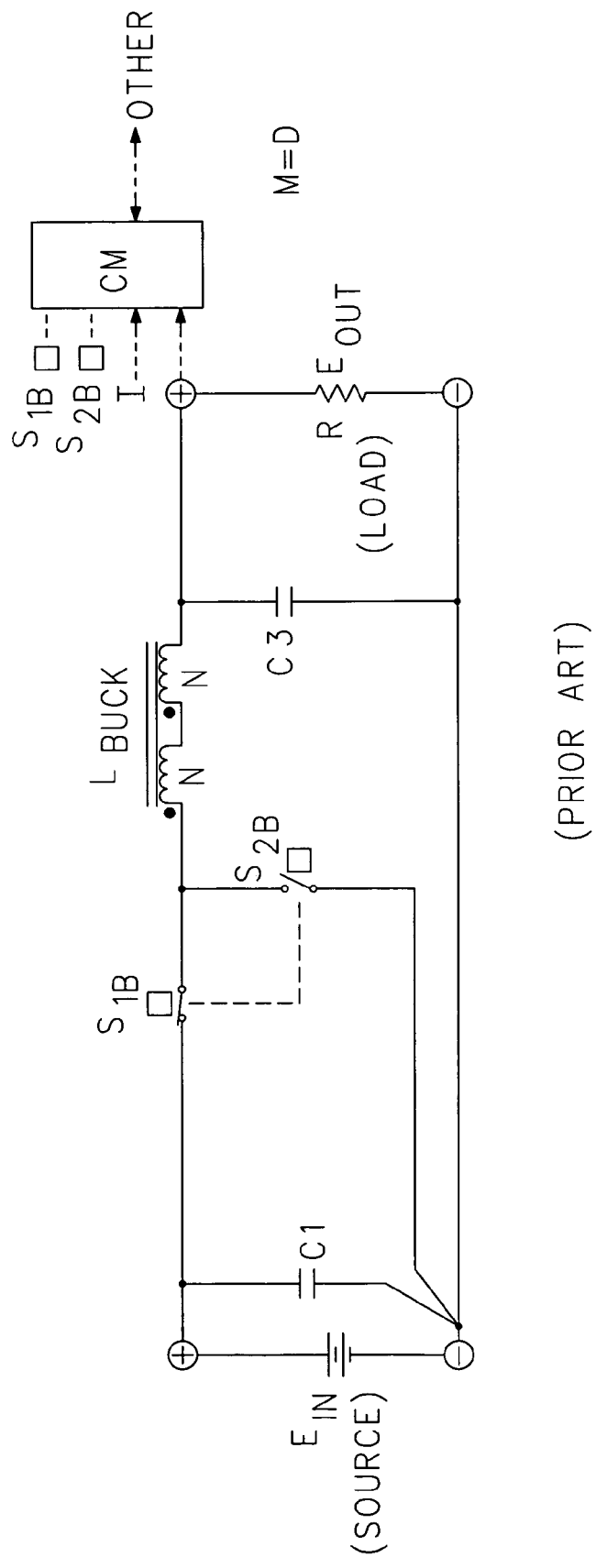
FIG. 1 is a schematic diagram illustrating a conventional BUCK converter.
Figure 2A:
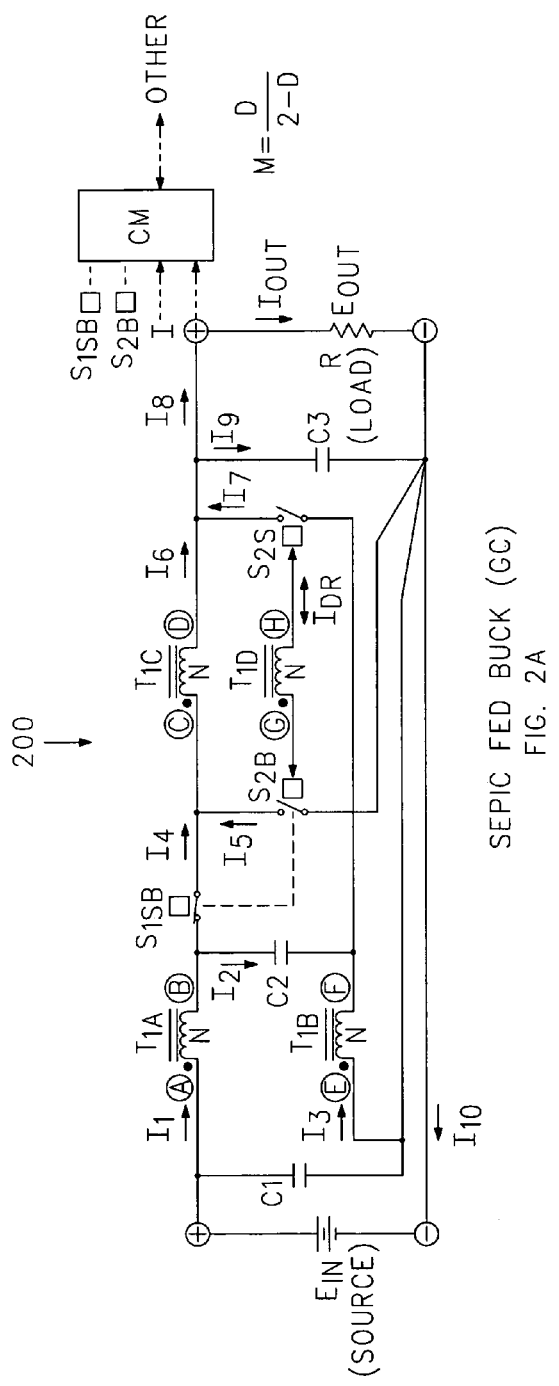
FIG. 2A is a schematic diagram illustrating an embodiment of a SEPIC FED BUCK converter.

FIG. 2A is a schematic diagram illustrating an embodiment of a SEPIC FED BUCK converter. An ideal circuit without parasitic effects is shown for purposes of clarity. In this example, device 200 includes a SEPIC portion coupled to a BUCK converter portion. Switch $S_{1SB}$ is coupled to both the SEPIC portion and the BUCK converter portion. As will be described in greater detail below, the SEPIC portion and the BUCK converter portion are galvanically coupled. The SEPIC portion includes switch $S_{2S}$ (also referred to as the SEPIC portion associated switch) and a set of passive components including coupled inductors $T_{1A}$ and $T_{1B}$, capacitor $C_2$, as well as optional input capacitor $C_1$. An energy source $E_{in}$ (such as a battery) is coupled to the inductors at input nodes A and E. The negative terminal of the energy source is sometimes referred to as the ground terminal. The BUCK converter portion includes switch $S_{2B}$ (also referred to as the BUCK converter portion associated switch) and a set of passive components. In this case the passive components include inductor $T_{1C}$. A load R is optionally coupled between a terminal of inductor $T_{1C}$ and the negative terminal of the input source. Switch $S_{1SB}$ is configured to open or close according to a first switching signal. Switches $S_{2B}$ and $S_{2S}$ are configured to open or close according to a second switching signal. In the embodiment shown, the switching signals are provided by a controller 206, which is optionally included in the SFB converter in some embodiments. In various embodiments, the controller may be a discrete component separately coupled to the SFB converter circuitry, or an integrated component of the circuitry. The first and second switching signals are synchronized to be opposite of each other. In other words, when $S_{1SB}$ is open, $S_{2B}$ and $S_{2S}$ are closed, and vice versa. For purposes of clarity in the following discussions it is assumed that in the converter circuit, the inductors have the same inductance. Different inductance values may be used in other embodiments. The transfer function of the converter (i.e., the ratio of the output voltage $E_{out}$ to the input voltage $E_{in}$) is expressed as:

$$M = D/(2-D),$$

where D is the duty cycle of the switching signal associated with $S_{1SB}$, and where $D = \{1-[(E_{in}-E_{out})/(E_{in}+E_{out})]\}$.

In the embodiment shown, an input capacitor $C_1$, an intermediate capacitor $C_2$, an output capacitor $C_3$ are included to provide integrating functions. $S_{2B}$ and $S_{2S}$ are implemented using transistors that include gate terminals. An optional drive inductor $T_{1D}$ is included in the circuit to provide common mode drive to the gate terminal of $S_{2S}$ to turn the transistor of $S_{2S}$ off or on, thereby opening or closing the switch. $T_{1D}$, however, does not substantially perform power conversion function in this example. In some embodiments, drive inductor $T_{1D}$ is replaced with a solid state driver or any other appropriate driver.

Figure 2B:
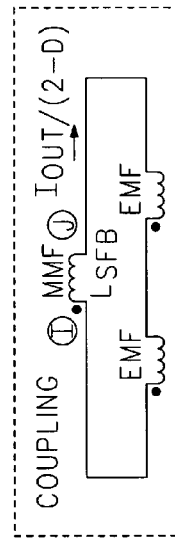
FIG. 2B is a diagram illustrating the magnetic structure of device 200 of FIG. 2A, with attendant voltage, current, and SEPIC FED BUCK coupling identities.
Figure 2B:
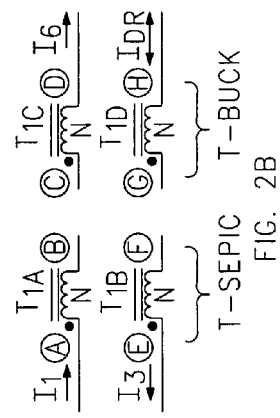

FIG. 2B is a diagram illustrating the magnetic structure of device 200 of FIG. 2A, with attendant voltage, current, and SEPIC FED BUCK coupling identities. In this example, inductive windings $T_{1A}$, $T_{1B}$, $T_{1C}$, and $T_{1D}$ share the same magnetic core.

Figure 2C:
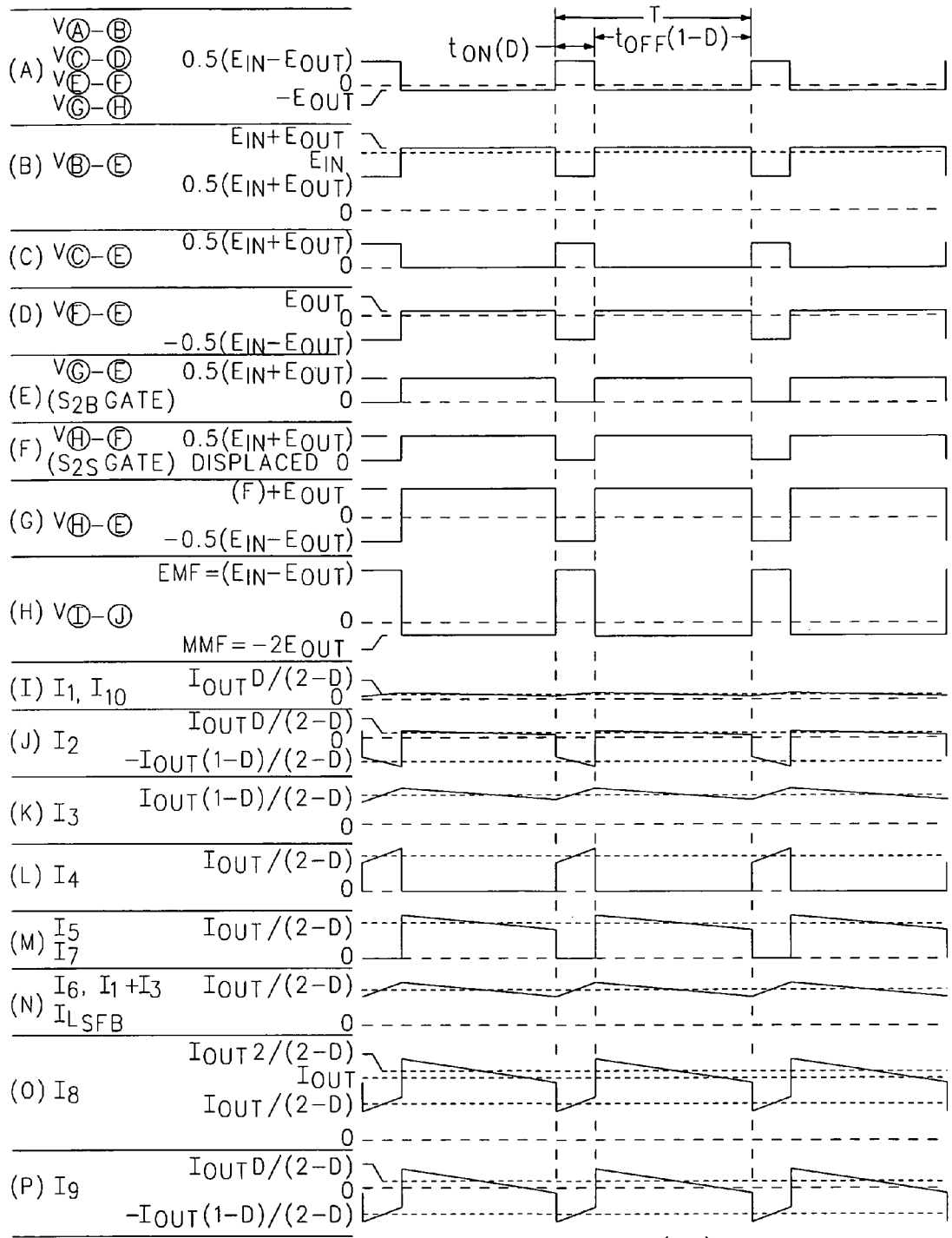
FIG. 2C is a set of graphs illustrating the timing, voltage, and current identities of device 200 of FIG. 2A, with attendant timing, voltage, and current summation expressions.

FIG. 2C is a set of graphs illustrating the timing, voltage, and current identities of device 200 of FIG. 2A, with attendant timing, voltage, and current summation expressions. In the examples shown, T represents a period of the switching signal, $t_{ON}$ represents the time period during which switch $S_{1SB}$ is closed (in other words, the transistor used to implement the switch is turned on), and $t_{OFF}$ represents the time period during which switch $S_{1SB}$ is open (the transistor is turned off). The duty cycle of the switching signal is represented as D.

Referring to FIGS. 2A and 2C, during $t_{ON}$, $S_{1SB}$ is closed while $S_{2B}$ and $S_{2S}$ are open. DC currents $I_1$ and $I_3$ flow through inductors $T_{1A}$ and $T_{1B}$, respectively. Thus, energy from the source is stored in the inductors in the SEPIC portion. During this time, the SEPIC portion does not directly deliver energy to the load, but delivers energy from the source to the BUCK converter portion. At the same time, current $I_6$ flows through $T_{1C}$. Energy is therefore stored in the inductor in the BUCK converter portion. According to FIG. 2C, $I_2$ (graph J) is the current through capacitor $C_2$, and $I_9$ (graph P) is the current through capacitor $C_3$. During $t_{ON}$, $C_2$ and $C_3$ discharge (set), and current $I_{out}$ is delivered to the load. Thus, the BUCK converter portion delivers energy to the load during $t_{ON}$.

Again referring to FIGS. 2A and 2C, during $t_{OFF}$, $S_{1SB}$ is open while $S_{2B}$ and $S_{2S}$ are closed. Inductors $T_{1A}$ and $T_{1B}$ maintain DC current flow. The SEPIC portion delivers at least some of its stored energy through switch $S_{2S}$ to the load without substantially storing energy in its inductors. Because the closed switch $S_{2S}$ forms an electrical path between the SEPIC portion and the load and because the electrical path has DC continuity, the energy transfer process does not require transformer action. Thus, the circuit is said to be galvanically coupled. The BUCK converter portion also delivers at least some of the energy that was stored in its inductor during $t_{OFF}$. The BUCK converter portion, however, does not substantially store energy during $t_{OFF}$. $C_2$ and $C_3$ charge (reset) during this period. The ON/OFF cycle is then repeated.

Figure 2D:
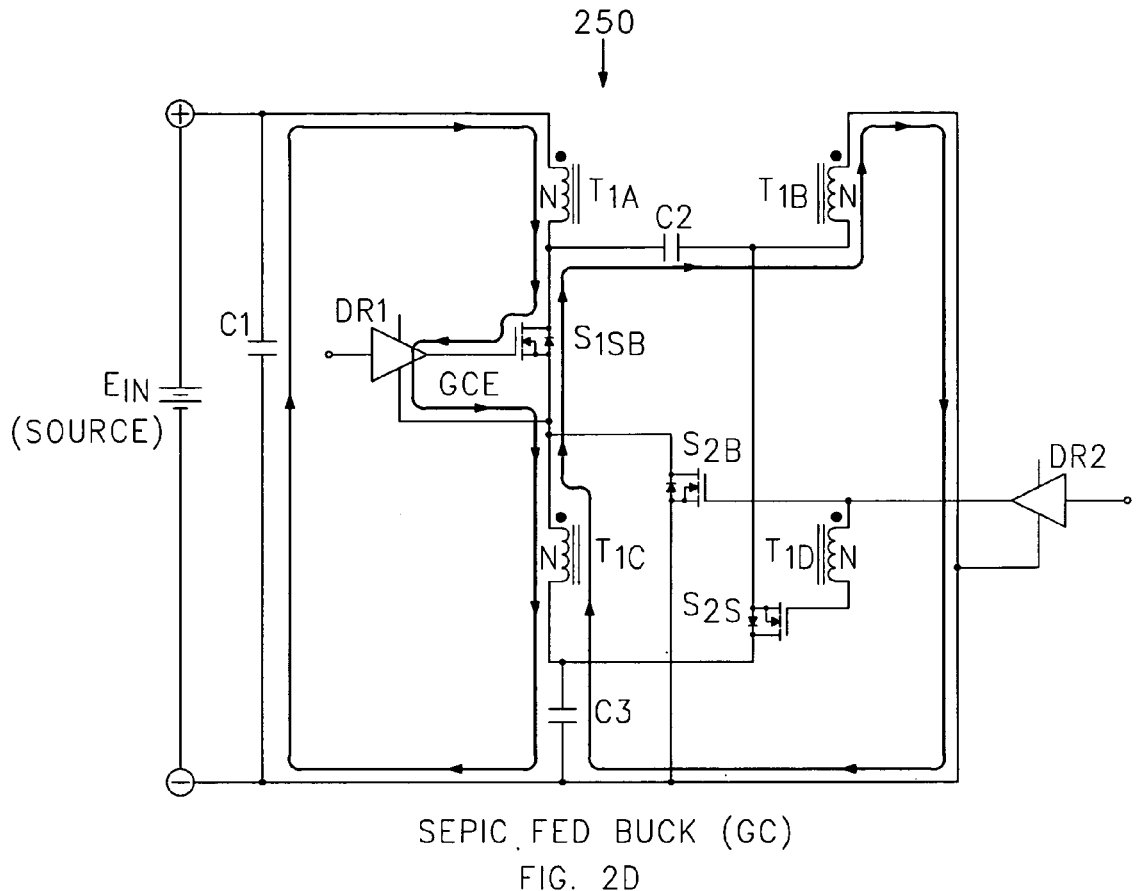
FIG. 2D is a schematic diagram illustrating an embodiment of an SFB converter that is configured to perform a Gate Charge Extraction (GCE) process when the $S_{1SB}$ switch is turned off.

In some embodiments, the SFB converter is configured to implement a gate extraction process to reduce turn-off power loss and improve turn-off speed. FIG. 2D is a schematic diagram illustrating an embodiment of an SFB converter that is configured to perform a Gate Charge Extraction (GCE) process when the $S_{1SB}$ switch is turned off. In this example, device 250 is similar to device 200 shown in FIG. 2A. Switches $S_{1SB}$, $S_{2B}$ and $S_{2S}$ are implemented using metal-oxide field-effect transistors (MOSFETs). Outputs of drivers DR1 and DR2 are coupled to the gates of the MOSFETs, providing switching signals that turn the transistors off and on. Driver return terminals 262 and 264 are coupled to the sources of their respective MOSFETs. During $t_{OFF}$, the voltage applied to the gate terminal of MOSFET $S_{1SB}$ drops to turn the device off. Inductor $T_{1A}$, however, will maintain its current flow, thus causing a current 268 to flow from the gate to the driver, thereby extracting charges accumulated in the gate-source capacitance of the MOSFET. Current 268 is therefore referred to as the GCE current. Since inductor $T_{1B}$ is coupled to $T_{1A}$, a current 270 is induced in $T_{1B}$. Current 270, referred to as the GCE induced current, flows in a loop in the opposite direction as current 268. Currents 268 and 270 combine to form a turn-off current. The GCE process allows SFB converter 250 to have fast turn off time and low turn off loss.

Figure 2E:
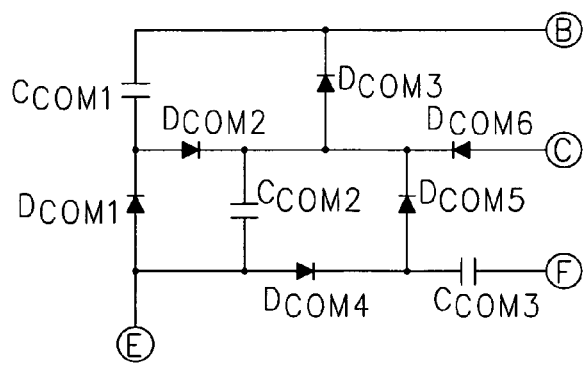
FIG. 2E is a schematic diagram illustrating an embodiment of a commutation matrix included in SFB converter 200 of FIG. 2A.

In some embodiments, the SFB converter includes a commutation matrix to improve the converter's turn-on characteristics by using a capacitance set/reset process to contain parasitic energy. FIG. 2E is a schematic diagram illustrating an embodiment of a commutation matrix included in SFB converter 200 of FIG. 2A. In the example shown, commutation matrix 280 includes a set of diodes and capacitors. Nodes B, C, E, and F of the commutation matrix are coupled to nodes B, C, E, and F of SFB converter 200. Voltage identities associated with the capacitors $C_{com1}$, $C_{com2}$, and $C_{com3}$ are expressed as:

$$E_{Ccom1}=E_{Ccom2}=(E_{in}+E_{out})/2; \text{ and}$$

$$E_{Ccom3}=(E_{in}-E_{out})/2.$$

Figure 3:
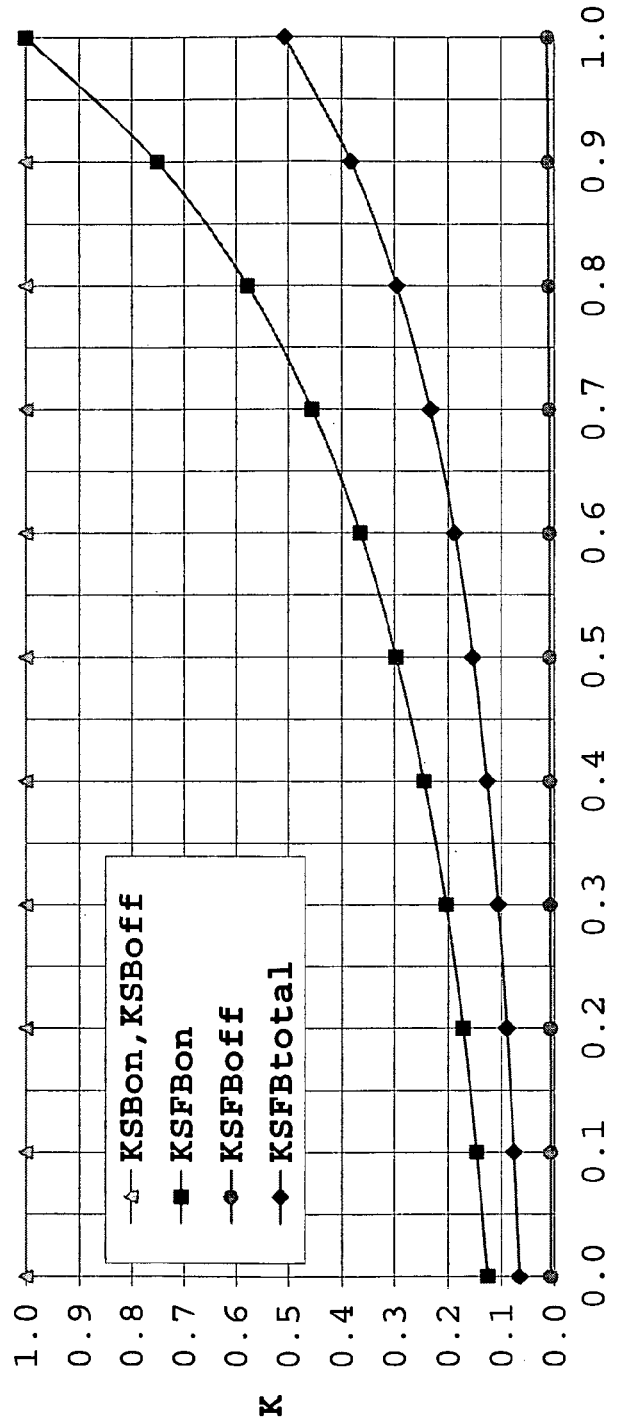
FIG. 3 is a graph illustrating the turn-on or turn-off loss ratios (K) associated with a $S_{1B}$ switch of a conventional BUCK converter and a $S_{1SB}$ switch of a comparatively identical SFB converter embodiment.

FIG. 3 is a graph illustrating the turn-on or turn-off loss ratios (K) associated with a $S_{1B}$ switch of a conventional BUCK converter and a $S_{1SB}$ switch of a comparatively identical SFB converter embodiment. In this example, turn-on or turn-off loss of switch $S_{1SB}$ of SFB converter 250 is compared with that of switch $S_{1B}$ of conventional BUCK converter 100. In this example, converters 100 and 250 are said to be comparatively identical since they are assumed to have switches with identical characteristics, and the same $E_{in}$ and $I_{out}$. The switches are assumed to turn on and off at the same rate. When the switch is turned on (i.e., the switch is closed), the voltage across the switch does not drop to zero instantaneously, therefore causes turn-on loss. When the switch is turned off (i.e., the switch is open), the current through the switch also does not drop to zero instantaneously and also causes turn-off loss. The turn-on and turn-off loss of the conventional BUCK converter 100 is assumed to be 1, shown as line 300.

A first order approximation of the ratio of the turn-on loss of the SFB converter 250 to the turn-on loss of the BUCK converter 100 is expressed as:

$$K_{SFBon}=1/(2-D)^3,$$

where D is the duty cycle of the switching signal. The loss curve as a function of D corresponds to curve 302 in the figure.

A first order approximation of the ratio of turn-off loss of the SFB converter to turn-off loss of the BUCK converter is expressed as:

$$K_{SFBoff}=a^2/[2E_{in}^2(2-D)],$$

where a corresponds to a device transconductance characteristic and $E_{in}$ corresponds to an input voltage of the converter. The loss curve corresponds to curve 304.

A first order approximation of the ratio of the total (turn-on plus turn-off) loss of the SFB converter to the total loss of the BUCK converter is expressed as:

$$K_{SFBTotal}=0.5(K_{SFBon}+K_{SFBoff}).$$

The loss curve corresponds to curve 306.

Figure 4A:
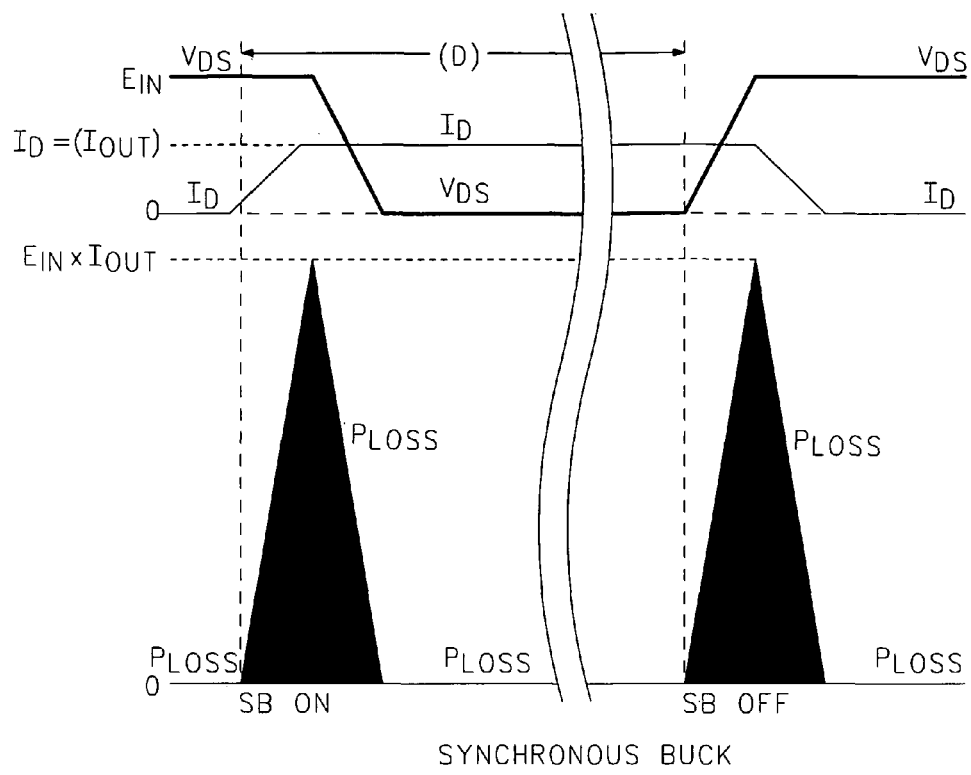
FIG. 4A is a graph illustrating the first order approximation of turn-on and turn-off losses associated with switch $S_{1B}$ of BUCK converter 100.

FIG. 4A is a graph illustrating the first order approximation of turn-on and turn-off losses associated with switch $S_{1B}$ of BUCK converter 100. The attendant switch voltage, switch current, and switch power identities and expressions in terms of the duty cycle of the switch (D) are also illustrated.

Figure 4B:
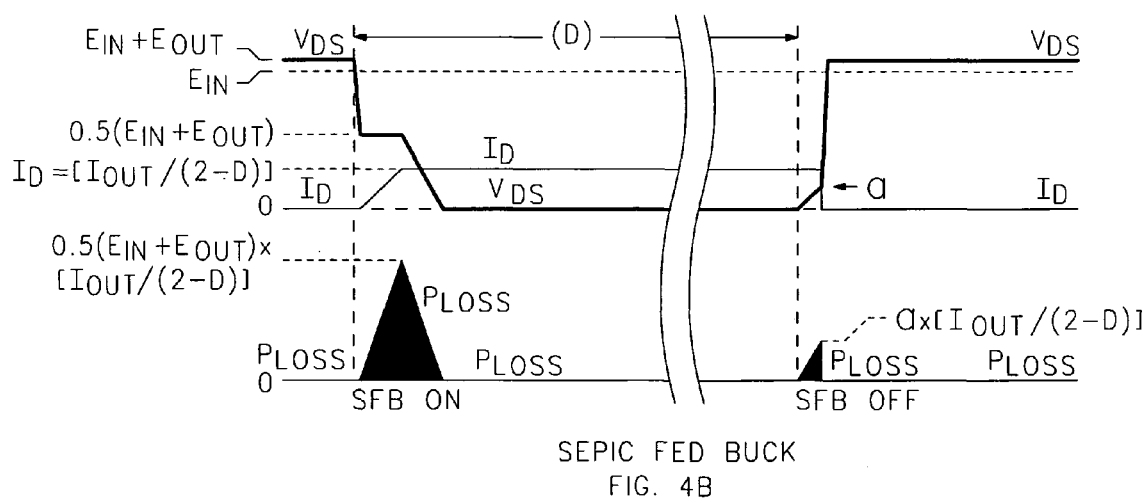
FIG. 4B is a graph illustrating the first order approximation of turn-on and turn-off losses associated with switch $S_{1SB}$ of SFB converter 250, as well as attendant switch voltage, switch current, and switch power loss identities and expressions in terms of the duty cycle of the switch (D).

FIG. 4B is a graph illustrating the first order approximation of turn-on and turn-off losses associated with switch $S_{1SB}$ of SFB converter 250, as well as attendant switch voltage, switch current, and switch power loss identities and expressions in terms of the duty cycle of the switch (D). Since the operating current $I_D$ associated with switch $S_{1SB}$ of SFB converter 250 is significantly less than the operating current $I_D$ associated with switch $S_{1B}$ of BUCK converter 100, the turn-on loss is significantly reduced. A first order approximation of turn-on power loss associated with turning on $S_{1SB}$ is:

$$P_{LossSFBon}=[0.25(E_{in}+E_{out}) \cdot I_{out}(2-D)] \cdot T_{turn-on} f,$$

wherein $E_{in}$ corresponds to the input voltage of the converter, $I_{out}$ corresponds to the output current of the converter, D corresponds to the duty cycle of the switching signal, $T_{turn-on}$ corresponds to the amount of time required to turn on the switch, and f corresponds to the frequency of the switching signal.

A first order approximation of turn-off power loss associated with turning off $S_{1SB}$ is:

$$P_{LossSFBoff}=0.5a \cdot [I_{out}(2-D)] \cdot T_{turn-off} f,$$

wherein a corresponds to a device transconductance characteristic (which equals 2 volts in this example), $I_{out}$ corresponds to an output current of the converter, D corresponds to the duty cycle of the switching signal, $T_{turn-off}$ corresponds to the turn-off time of the switch, and f corresponds to the frequency of the switching signal.

Figure 5A:
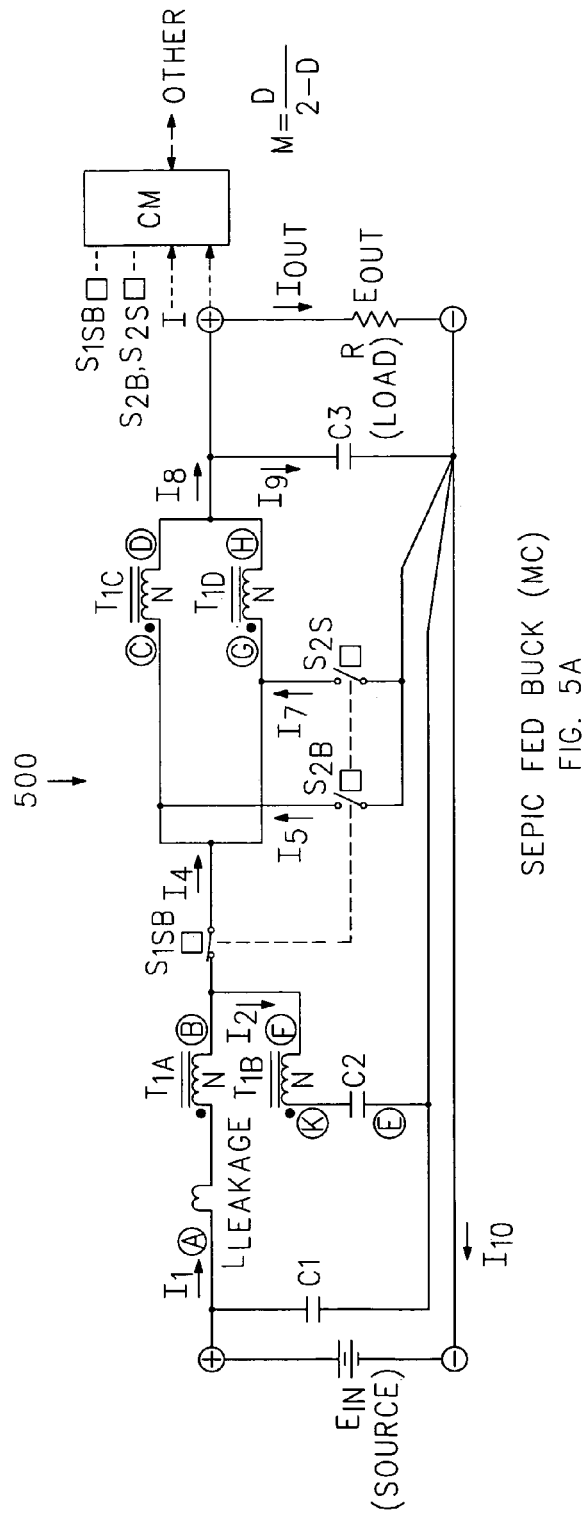
FIG. 5A is a schematic diagram illustrating an embodiment of a single magnetic, magnetically coupled SEPIC FED BUCK converter with attendant voltage, current, and transfer function (M) identities.
Figure 5B:
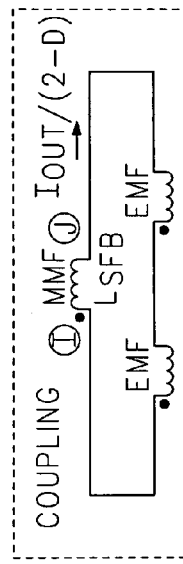
FIG. 5B illustrates the magnetic structure of converter 500 of FIG. 5A, with attendant voltage, current, and SEPIC FED BUCK coupling identities.

Several other SEPIC FED BUCK converter topologies exist. FIG. 5A is a schematic diagram illustrating an embodiment of a single magnetic, magnetically coupled SEPIC FED BUCK converter with attendant voltage, current, and transfer function (M) identities. Converter 500 shown in this example includes a SEPIC portion and a BUCK converter portion that are magnetically coupled. The portions are said to be magnetically coupled because there is no galvanic path for transferring energy from the SEPIC portion to the load when $S_{1SB}$ is turned off; instead, inductors $T_{1C}$ and $T_{1D}$ act as transformers to transfer energy stored in SEPIC windings $T_{1A}$ and $T_{1B}$ to the load. FIG. 5B illustrates the magnetic structure of converter 500 of FIG. 5A, with attendant voltage, current, and SEPIC FED BUCK coupling identities.

Figure 5C:
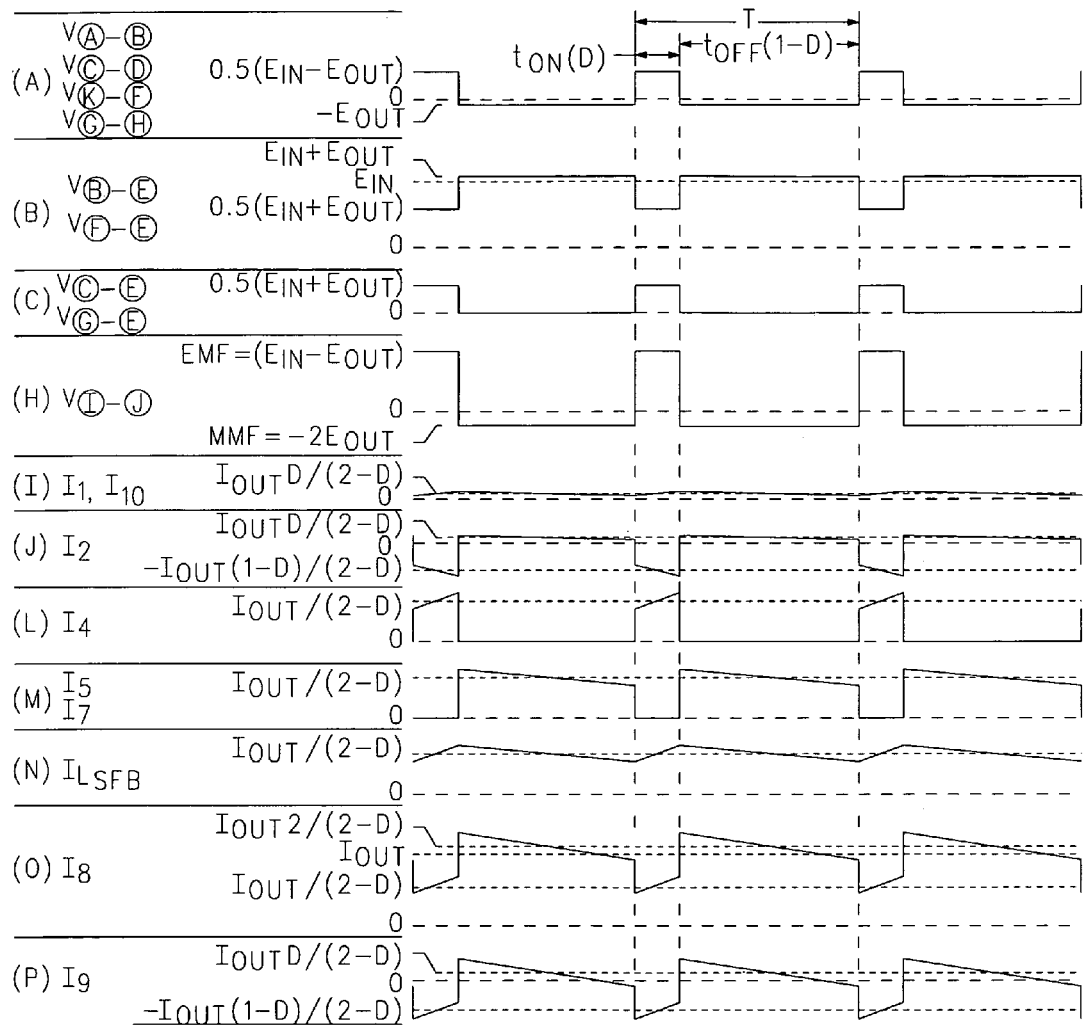
FIG. 5C is a set of graphs illustrating the timing, voltage, and current identities of device 500 of FIG. 5A, with attendant timing, voltage, and current summation expressions.

FIG. 5C is a set of graphs illustrating the timing, voltage, and current identities of device 500 of FIG. 5A, with attendant timing, voltage, and current summation expressions.

Figure 5D:
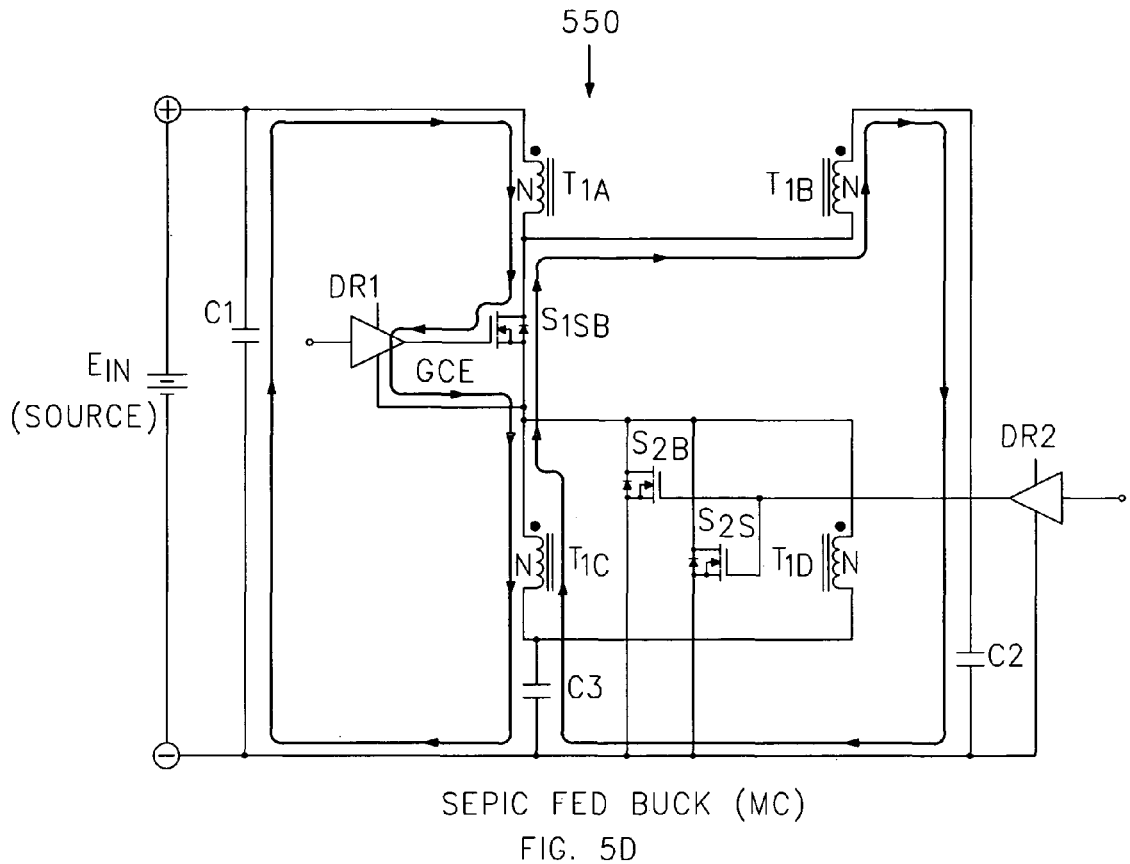
FIG. 5D is a schematic diagram illustrating an SFB converter during a GCE process.

FIG. 5D is a schematic diagram illustrating an SFB converter during a GCE process. SFB converter 550 shown in this example is similar to converter 500 of FIG. 5A. SFB converter 550 is magnetically coupled. As shown in this diagram, when $S_{1SB}$ switches off, GCE current 568 flows in the opposite direction as GCE induced current 570, and charges in the gate-source capacitance of switch $S_{1SB}$ are quickly removed.

Figure 5E:
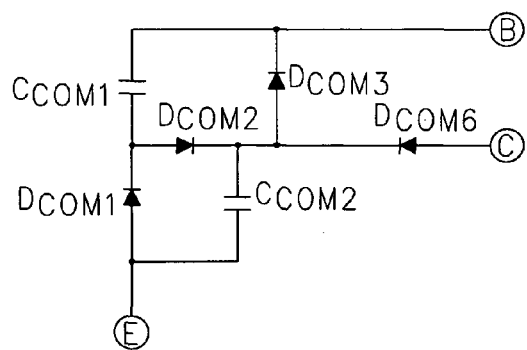
FIG. 5E is a schematic diagram illustrating a commutation matrix included in SFB converter 500 of FIG. 5A.

FIG. 5E is a schematic diagram illustrating a commutation matrix included in SFB converter 500 of FIG. 5A. Nodes B, C, and E of the commutation matrix are coupled to nodes B, C, E of SFB converter 500. Voltage identities associated with capacitors $C_{com1}$ and $C_{com2}$ are expressed as:

$$E_{Ccom1}=E_{Ccom2}=(E_{in}+E_{out})/2.$$

In some embodiments, the SFB is configured as a multiphase converter. FIG. 6A is a schematic diagram illustrating an embodiment of a multi-phase magnetically coupled, single magnetic SFB converter with attendant voltage, current, and transfer function (M) identities. In this example, converter 600 includes a first SEPIC portion comprising inductors $T_{1A}$ and $T_{1B}$ and switch $S_{1S}$, and a second SEPIC portion comprising inductors $T_{1E}$ and $T_{1F}$ and switch $S_{2S}$. The inductors SEPIC portions are magnetically coupled. The input and output are isolated by a transformer comprising the inductive windings. The converter further includes a first BUCK converter portion comprising inductors $T_{1C}$ and $T_{1G}$ and switch $S_{1B}$, and a second BUCK converter portion comprising inductors $T_{1D}$ and $T_{1H}$ and switch $S_{2B}$. The inductors in the BUCK converter portions are also magnetically coupled. Switch $S_{1SB}$ couples the first SEPIC portion to the first BUCK converter portion, and switch $S_{2SB}$ couples the second SEPIC portion to the second BUCK converter portion. A commutation matrix similar to what was shown in FIG. 5E is included in the converter.

Figure 6B:
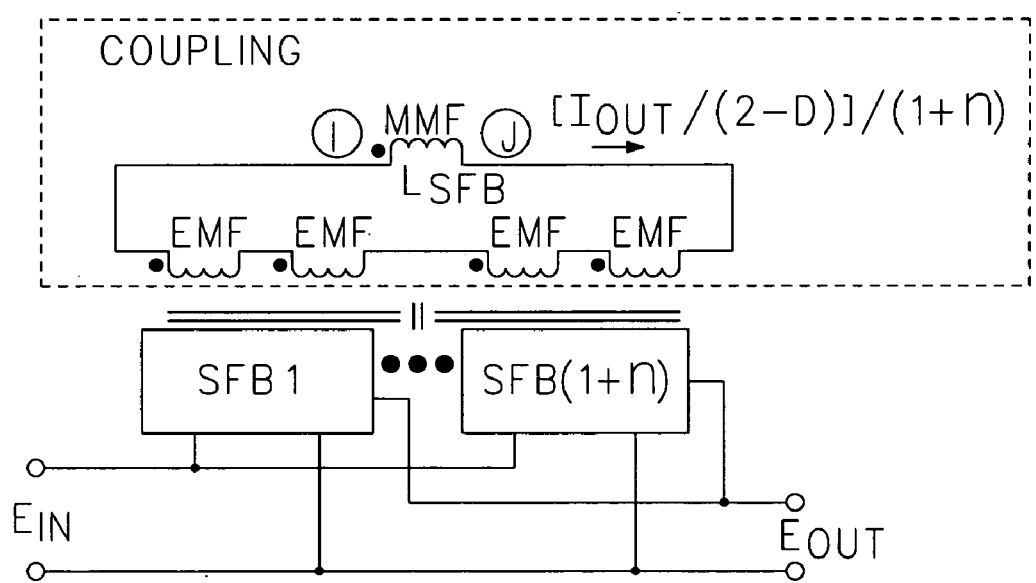
FIG. 6B is a diagram illustrating the magnetic structure of converter 600 of FIG. 6A, with attendant voltage, current, and SEPIC FED BUCK coupling identities.

FIG. 6B is a diagram illustrating the magnetic structure of converter 600 of FIG. 6A, with attendant voltage, current, and SEPIC FED BUCK coupling identities.

Figure 6C:
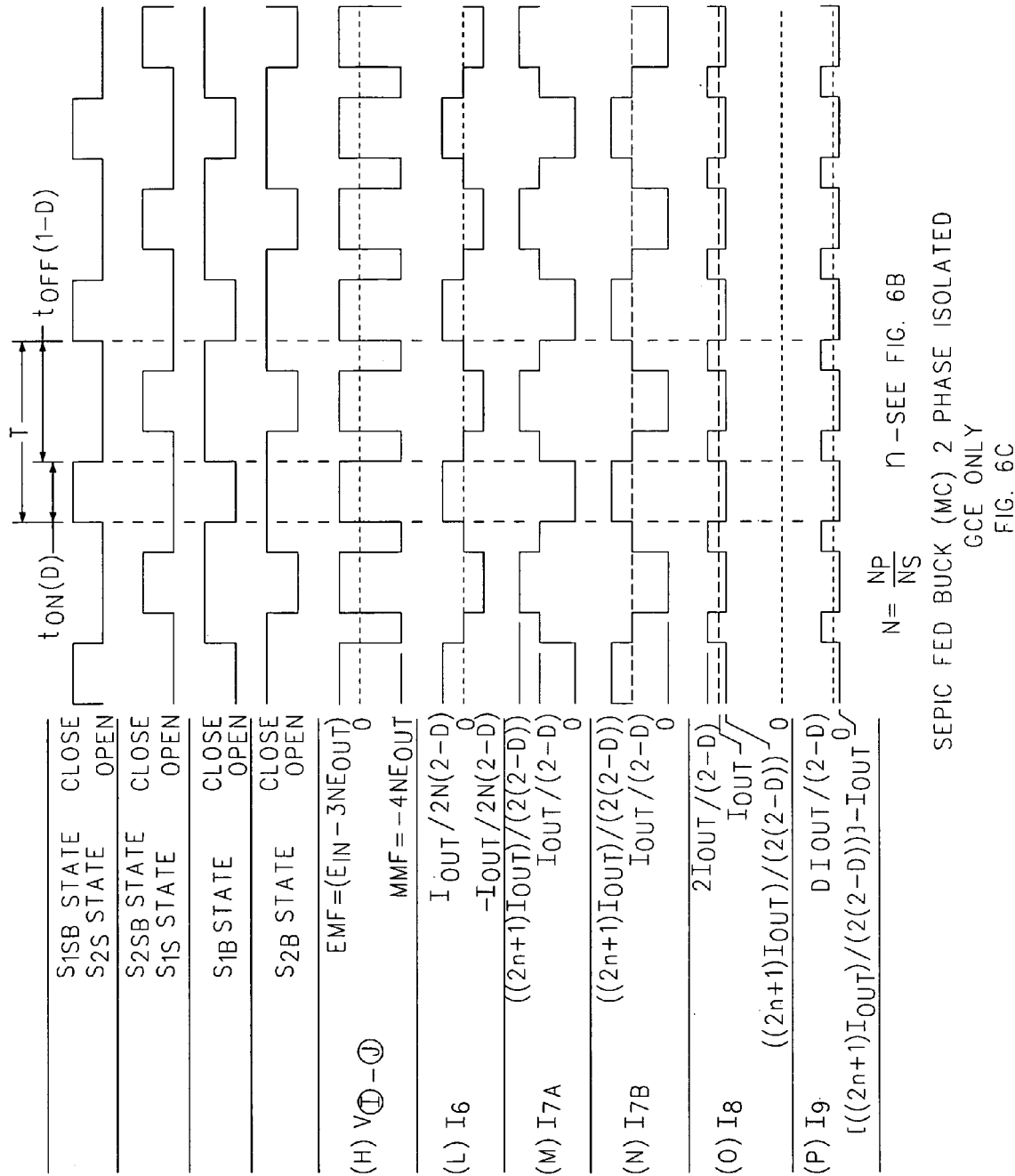
FIG. 6C is a set of graphs illustrating the timing, voltage, and current identities of device 600 of FIG. 6A, with attendant timing, voltage, and current summation expressions.

FIG. 6C is a set of graphs illustrating the timing, voltage, and current identities of device 600 of FIG. 6A, with attendant timing, voltage, and current summation expressions. The switching signals for switches $S_{1SB}$ and $S_{2SB}$ have a phase offset. The switching signals for switches $S_{1B}$ and $S_{1SB}$ are opposite of each other, and the switching signals for switches $S_{2B}$ and $S_{2SB}$ are opposite. A first switching signal controlling switches $S_{1SB}$, $S_{1S}$ and $S_{1B}$ have a phase offset relative to a second switching signal controlling switches $S_{2SB}$, $S_{2S}$ and $S_{2B}$. The first switching signal causes switches $S_{1SB}$, $S_{1S}$ and $S_{1B}$ to operate in concert such that when $S_{1SB}$ is closed, the first SEPIC portion stores energy, and the first BUCK converter portion delivers energy to the load and stores energy; when $S_{1SB}$ is open, the first SEPIC portion and the first BUCK converter portion both deliver energy to the load. The second switching signal causes switches $S_{2SB}$, $S_{2S}$ and $S_{2B}$ to similarly affect the operations of the second SEPIC portion and the second BUCK converter portion.

Although the above example shows a 2 phase isolated SFB converter, some converter embodiments are configured to include additional SEPIC and BUCK converter portions coupled in a similar manner to produce an N-phase SFB converter.

Figure 7B:
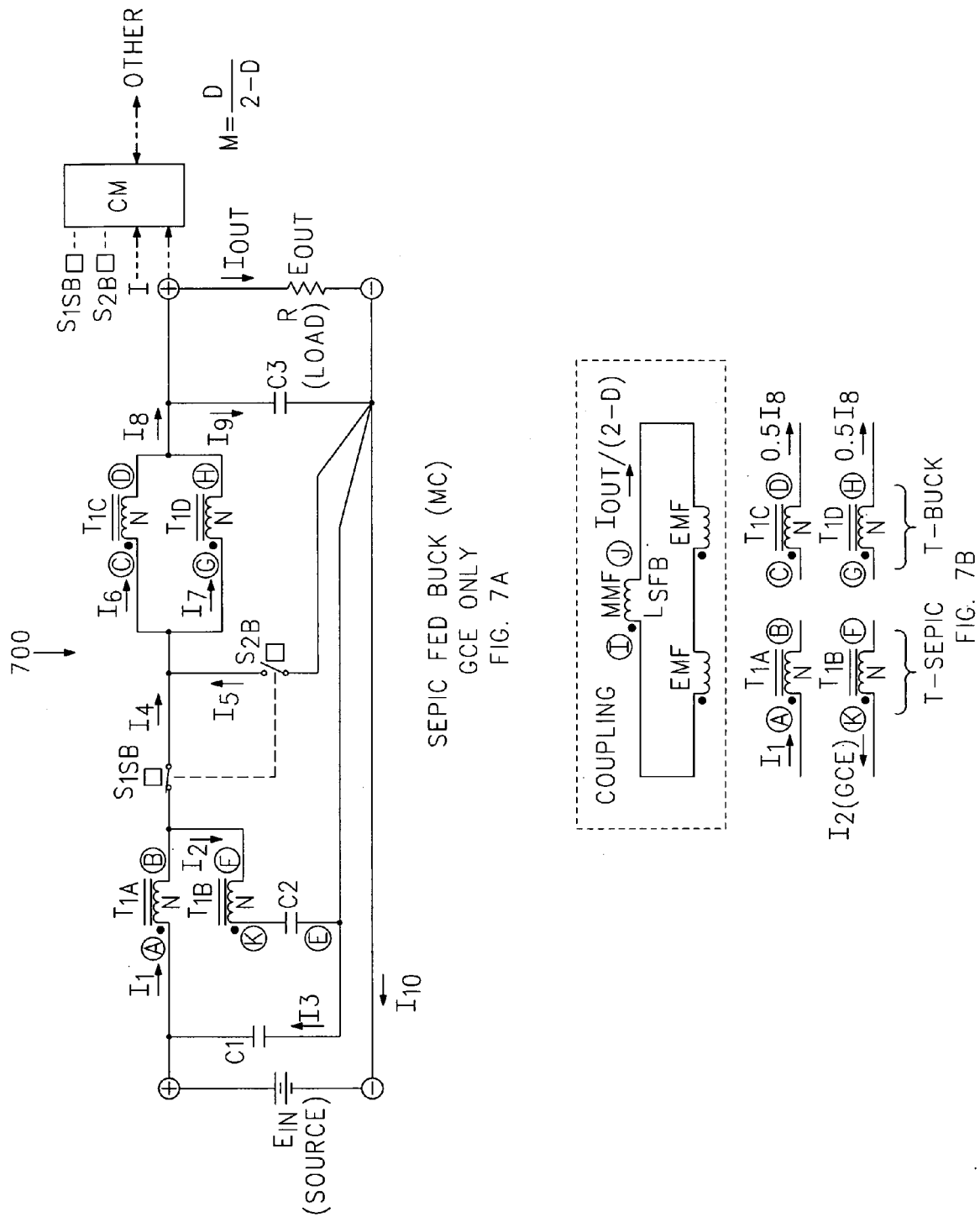
FIG. 7B is a diagram illustrating the magnetic structure of SFB converter 700 of FIG. 7A, with attendant voltage, current, and SEPIC FED BUCK coupling identities.
Figure 7C:
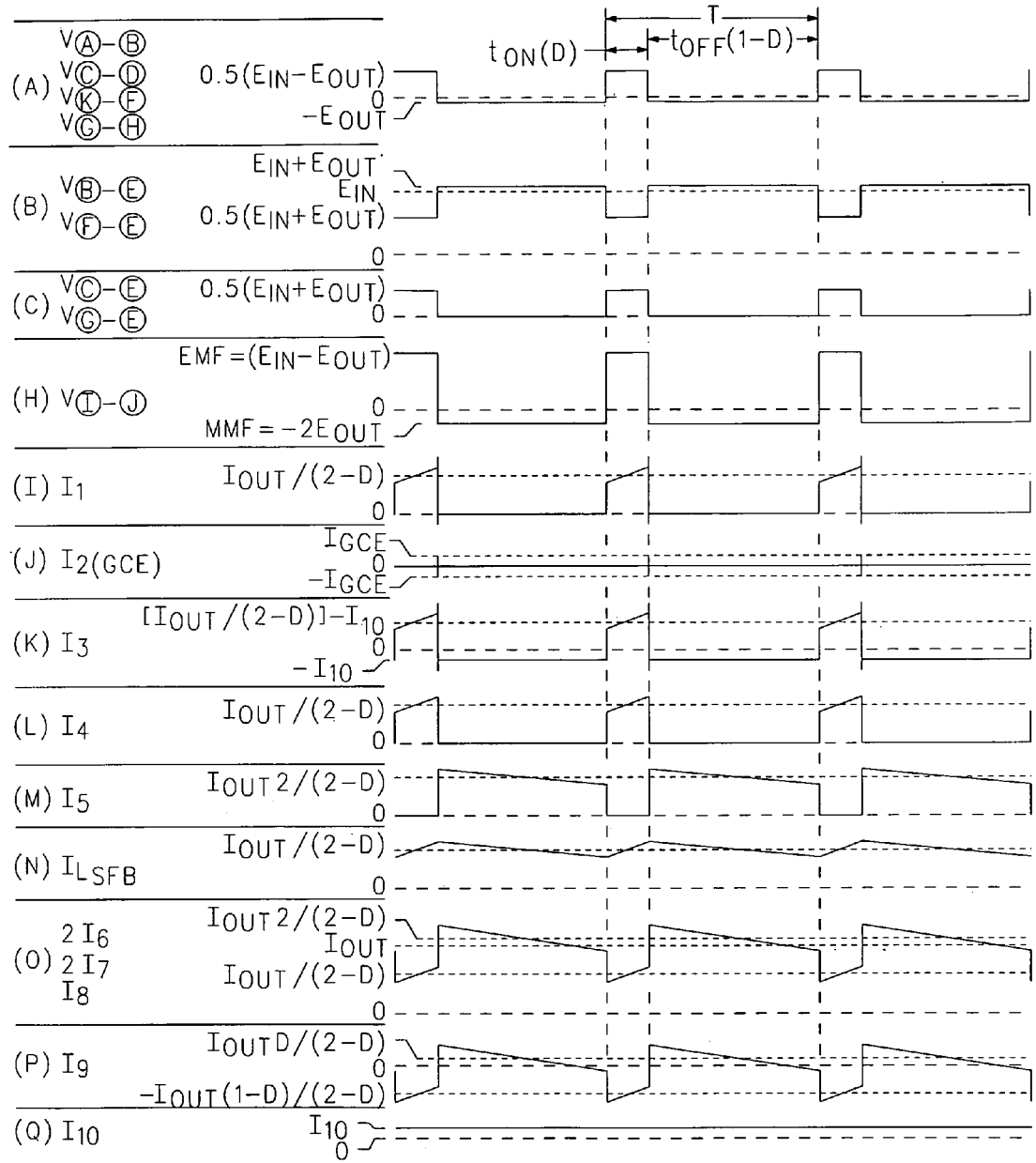
FIG. 7C is a set of graphs illustrating the timing, voltage, and current identities of SFB converter 700 of FIG. 7A, with attendant timing, voltage, and current summation expressions.

FIG. 7A is a schematic diagram illustrating another embodiment of a SFB converter. In this example, SFB converter 700 is magnetically coupled. In various embodiments, $T_{1C}$ and $T_{1D}$ may be combined into a single conductor or separated as multiple conductors. FIG. 7B is a diagram illustrating the magnetic structure of SFB converter 700 of FIG. 7A, with attendant voltage, current, and SEPIC FED BUCK coupling identities. A commutation matrix similar to FIG. 5E is optionally coupled to the converter at nodes B, C, and E. FIG. 7C is a set of graphs illustrating the timing, voltage, and current identities of SFB converter 700 of FIG. 7A, with attendant timing, voltage, and current summation expressions. As shown in current $I_2$ (graph J), one of the SEPIC inductors $T_{1B}$ principally conducts current during the GCE process. Thus, SFB converter 700 experiences turn-off energy loss that is even smaller than SFB converter embodiments 200 and 500.

Figure 8A:
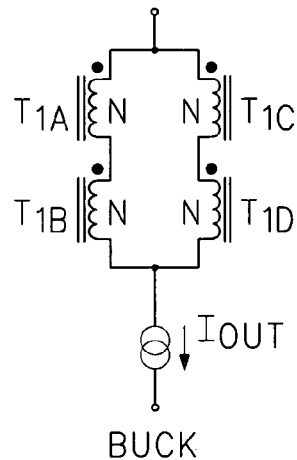
Figure 8B:
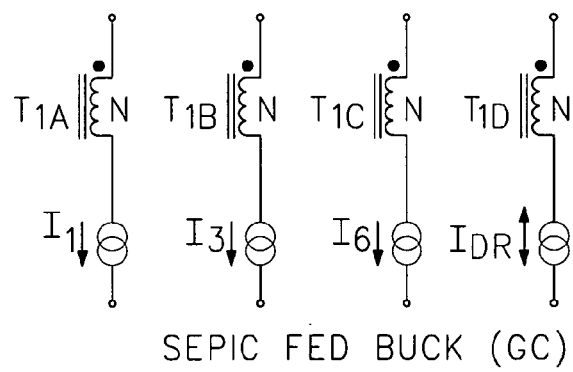

Compared to conventional BUCK converters, SFB converters have reduced conductive loss because of the way the inductive windings are deployed in SFB converters. FIGS. 8A-8D illustrate the inductive windings in a conventional BUCK converter and in several SFB converters, with attendant current identities and dimensional expressions. In FIG. 8A, four inductive windings $T_{1A}$, $T_{1B}$, $T_{1C}$, and $T_{1D}$ of BUCK converter 100 are shown. The inductive windings share the same magnetic core. The same magnetic windings are also present in FIG. 8B, FIG. 8C, and FIG. 8D, which correspond to SFB converter 200, 500, and 700, respectively. The windings of the BUCK converter and the SFB converters are dimensionally identical since they have the same magnetic core area, window area, and number of turns. Different converter topologies, however, result in different amounts of current through individual windings. Assuming that the converters have the same output power and include windings that have the same resistance, the amounts of energy dissipated in the windings are different since the current values are different.

Figure 8E:
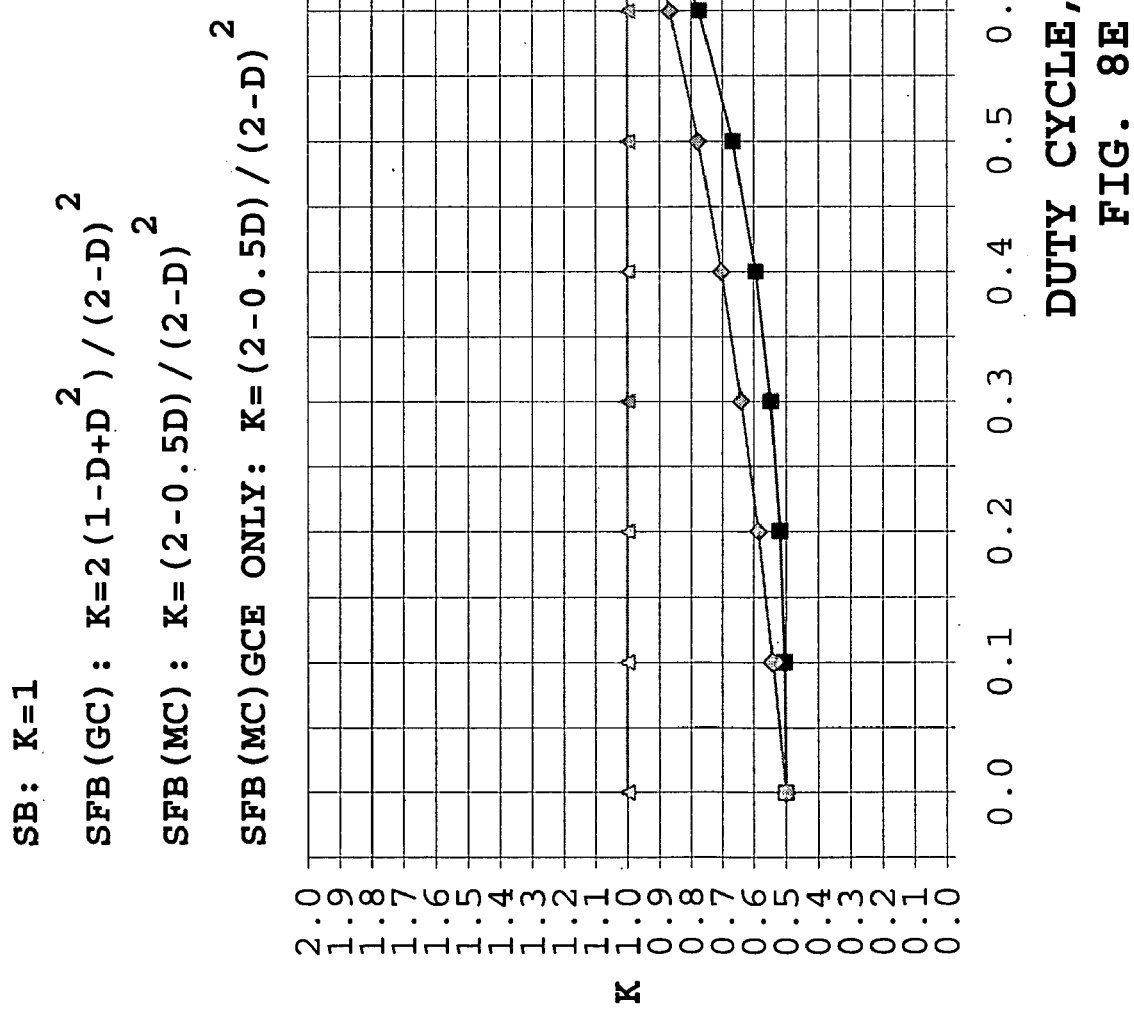
FIG. 8E is a graph illustrating the conductive loss ratios of a conventional BUCK converter and SFB converters.

FIG. 8E is a graph illustrating the conductive loss ratios of a conventional BUCK converter and SFB converters. The graph compares the loss ratios of the conventional BUCK converter 100 and the SFB converters 200, 500, and 700. It is assumed that the converters have discrete components of the same values and have the same $E_{in}$ and $I_{out}$. The switches are assumed to turn on and off at the same rate. The conductive loss ratio (K) is expressed in terms of duty cycle (D). The conductive loss ratio of BUCK converter 100 is assumed to be 1, shown as line 800.

The conductive loss ratio of SFB 200 is shown as curve 802 and is expressed as:

$$K=2(1-D+D^2)/(2-D)^2$$

The conductive loss ratios of SFB 500 and 700 are the same. The ratio as a function of D is shown as curve 804, and is expressed as:

$$K=(2-0.5D)/(2-D)^2.$$

Figure 9:
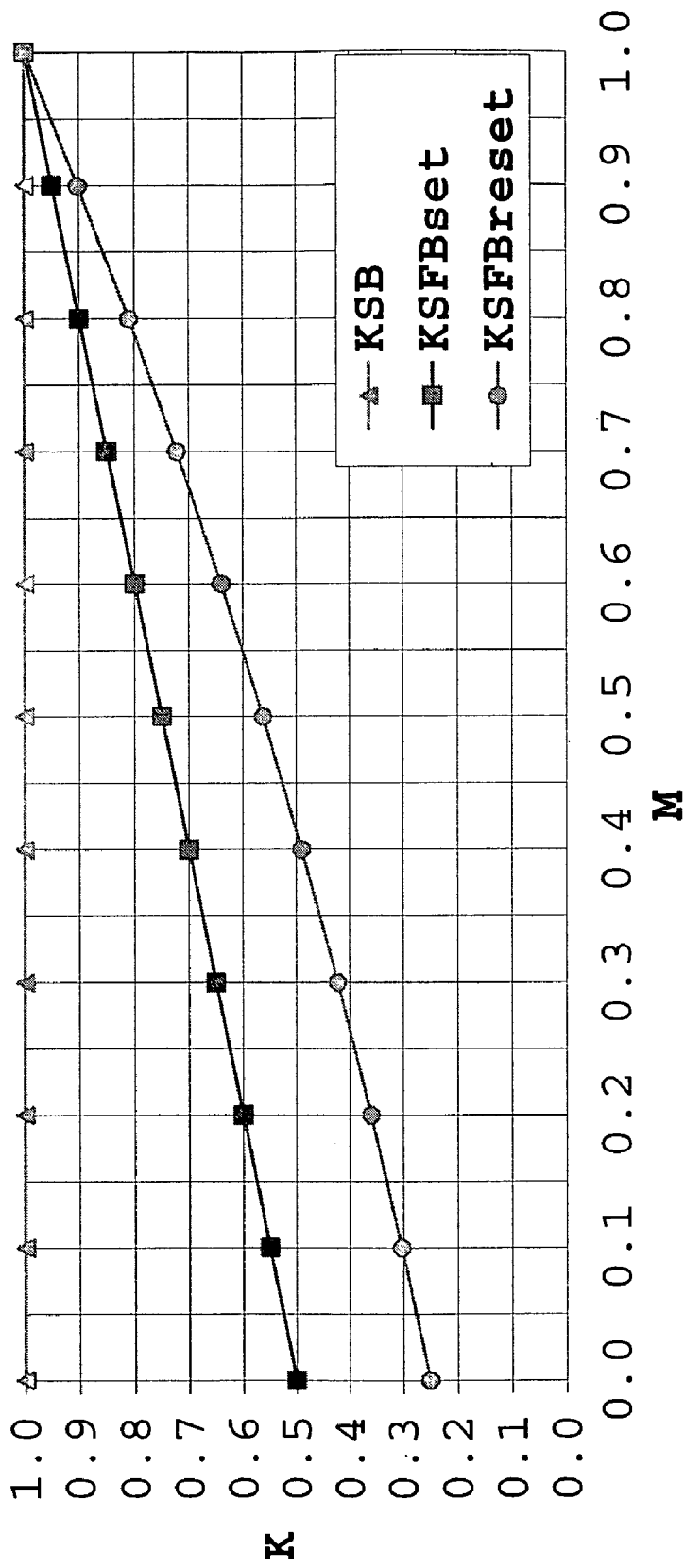
FIG. 9 is a graph illustrating the inductor set/reset ratios of a SFB converter (e.g., SFB 200, 500, 600 or 700) and a canonical BUCK converter.

The SFB converters also have faster transient response attributes. In comparison with a comparative identical conventional BUCK converter, the transient EMF (set) volt second (Et) of the integrating inductor and the MMF (reset) volt second (Et) of the integrating inductor in the SFB converter are both lower. FIG. 9 is a graph illustrating the inductor set/reset ratios of a SFB converter (e.g., SFB 200, 500, 600 or 700) and a canonical BUCK converter. The ratio K is expressed in terms of transfer function M. Assuming that the set ratio and the reset ratio of the conventional BUCK converter 100 are both 1, which is shown as line 900. The reset ratio of a SFB converter with the same passive component values, output, and switching duty cycle is shown as line 902 and is expressed as:

$$K_{SFBreset}=[(1+M)/2]^2,$$

where M=D/(2−D).

The set ratio of the SFB converter is shown as line 904 and is expressed as:

$$K_{SFBSet}=(1+M)/2.$$

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A DC-DC converter comprising:
a switch $S_{1SB}$, a switch $S_{2B}$, a switch $S_{2S}$, a capacitor $C_2$, an inductor $T_{1A}$, an inductor $T_{1B}$, and an inductor $T_{1C}$; wherein:
a first terminal of inductor $T_{1A}$ is coupled to a first terminal of an energy source;

a first terminal of capacitor $C_2$, a second terminal of inductor $T_{1A}$, and a first terminal of switch $S_{1SB}$ are coupled;

a first terminal of inductor $T_{1C}$, a second terminal of $S_{1SB}$, and a first terminal of $S_{2B}$ are coupled;

a second terminal of inductor $T_{1C}$ and a first terminal of $S_{2S}$ are coupled;

a first terminal of inductor $T_{1B}$ and a second terminal of $S_{2B}$ are configured for coupling with a second terminal of the energy source; and a second terminal of capacitor $C_2$, a second terminal of inductor $T_{1B}$, and a second terminal of $S_{2S}$ are coupled.

2. The DC-DC converter of claim 1, further comprising a capacitor C1 and a capacitor C3; wherein:

a first terminal of capacitor $C_1$ is coupled to the first terminal of inductor $T_{1A}$ and a second terminal of capacitor C1 is coupled to the first terminal of inductor $T_{1B}$; and a first terminal of capacitor $C_3$ is coupled to the second terminal of inductor $T_{1C}$ and a second terminal of capacitor $C_3$ is coupled to the first terminal of inductor $T_{1B}$.

3. The DC-DC converter of claim 1, wherein inductors $T_{1A}$, $T_{1B}$, and $T_{1C}$ are inductively coupled.

4. The DC-DC converter of claim 1, wherein the second terminal of inductor $T_{1C}$ is coupled to a load.

5. The DC-DC converter of claim 1, further comprising a commutation matrix coupled to the second terminal of inductor $T_{1A}$, the first terminal of inductor $T_{1C}$, and the first terminal of $T_{1B}$, and the second terminal of inductor $T_{1B}$.

6. The DC-DC converter of claim 1, further comprising an inductor $T_{1D}$, wherein the first terminal of inductor $T_{1D}$ is coupled to a gate terminal of switch $S_{2B}$ and a second terminal of inductor $T_{1D}$ is coupled to a gate terminal of switch $S_{2S}$.

7. The DC-DC converter of claim 1, further comprising a controller configured to provide a signal to switch $S_{1SB}$.

8. A DC-DC converter comprising:

a switch $S_{1SB}$, a switch $S_{2B}$, a switch $S_{2S}$, a capacitor $C_2$, an inductor $T_{1A}$, an inductor $T_{1B}$, an inductor $T_{1C}$, an inductor $T_{1D}$, and wherein:

a first terminal of inductor $T_{1A}$ is coupled to a first terminal of an energy source;

a second terminal of inductor $T_{1A}$, the first terminal of inductor $T_{1B}$ and a first terminal of switch $S_{1SB}$ are coupled;

the first terminal of inductor $T_{1C}$, a first terminal of inductor $T_{1D}$, a second terminal of switch $S_{1SB}$, a first terminal of switch $S_{2B}$, and a first terminal of switch $S_{2S}$ are coupled;

a second terminal of inductor $T_{1C}$ and a second terminal of inductor $T_{1D}$ are coupled; and a second terminal of capacitor $C_2$, a second terminal of switch $S_{2B}$, and a second terminal of switch $S_{2S}$ are coupled.

9. The DC-DC converter of claim 8, further comprising a capacitor $C_1$ and a capacitor $C_3$; wherein:

a first terminal of capacitor $C_1$ is coupled to the first terminal of inductor $T_{1A}$ and a second terminal of capacitor $C_1$ is coupled to the second terminal of capacitor $C_2$; and a first terminal of capacitor $C_3$ is coupled the second terminal of inductor $T_{1C}$ and a second terminal of capacitor $C_3$ is coupled to the second terminal of capacitor $C_2$.

10. The DC-DC converter of claim 8, wherein inductors $T_{1A}$, $T_{1B}$, $T_{1C}$, and $T_{1D}$ are inductively coupled.

11. The DC-DC converter of claim 8, wherein the second terminal of inductor $T_{1C}$ and the second terminal of $T_{1D}$ are coupled to a load.

12. The DC-DC converter of claim 8, further comprising a commutation matrix coupled to the second terminal of inductor $T_{1B}$, the first terminal of inductor $T_{1C}$, and the second terminal of capacitor $C_2$.

13. The DC-DC converter of claim 8, further comprising a controller configured to provide a signal to switch $S_{1SB}$.

14. A DC-DC converter comprising:

an inductor $T_{1A}$, an inductor $T_{1B}$, an inductor $T_{1C}$, an inductor $T_{1D}$, an inductor $T_{1E}$, an inductor $T_{1F}$, an inductor $T_{1G}$, an inductor $T_{1H}$, a capacitor $C_2$, a switch $S_{1SB}$, a switch $S_{2SB}$, a switch $S_{1S}$, a switch $S_{2S}$, a switch $S_{1B}$, and a switch $S_{2B}$; wherein:

a first terminal of inductor $T_{1A}$, a first terminal of inductor $T_{1F}$, and a first terminal of an energy source are coupled;

a second terminal of inductor $T_{1A}$, a first terminal of inductor $T_{1B}$, and a first terminal of switch $S_{1SB}$ are coupled;

a second terminal of switch $S_{1SB}$, a first terminal of switch $S_{1S}$, and a first terminal of inductor $T_{1C}$ are coupled;

a second terminal of inductor $T_{1C}$ and a first terminal of inductor $T_{1D}$ are coupled;

a first terminal of capacitor $C_2$, a second terminal of switch $S_{1S}$, and a first terminal of $S_{2S}$ are coupled;

a second terminal of inductor $T_{1D}$, a first terminal of $S_{2SB}$, and a second terminal of $S_{2S}$ are coupled;

a second terminal of inductor $T_{1E}$ and a second terminal of inductor $T_{1F}$ are coupled;

a first terminal of switch $S_{1B}$ and a first terminal of inductor $T_{1G}$ are coupled;

a first terminal of switch $S_{2B}$ and a first terminal of inductor $T_{1H}$ are coupled;

a second terminal of switch $S_{1B}$ and a second terminal of switch $S_{2B}$ are coupled to a first output terminal;

a second terminal of inductor $T_{1G}$ and a second terminal of inductor $T_{1H}$ are coupled to a second output terminal; and inductor $T_{1C}$, inductor $T_{1D}$, inductor $T_{1G}$, and inductor $T_{1H}$ are magnetically coupled.

15. The DC-DC converter of claim 14, further comprising a capacitor $C_1$ and a capacitor $C_3$; wherein:

a first terminal of capacitor $C_1$ is coupled the first terminal of inductor $T_{1A}$ and the second terminal of capacitor $C_1$ is coupled to the ground terminal; and the first terminal of inductor $C_3$ is coupled to the first output terminal and the second terminal of inductor $C_3$ is coupled to the second output terminal.

16. The DC-DC converter of claim 14, wherein inductors $T_{1A}$ and $T_{1B}$ are inductively coupled.

17. The DC-DC converter of claim 14, wherein the first output terminal and the second output terminals are coupled to a load.

18. The DC-DC converter of claim 14, further comprising a commutation matrix coupled to node B, node C, and node E.

19. The DC-DC converter of claim 14, further comprising a controller configured to provide a signal to switch $S_{1SB}$.

20. A DC-DC converter, comprising:

a switch $S_{1SB}$, a switch $S_{2B}$, a capacitor $C_2$, an inductor $T_{1A}$, an inductor $T_{1B}$, and an inductor $T_{1C}$; wherein:

a first terminal of inductor $T_{1A}$ is coupled to a first terminal of an energy source;

a second terminal of inductor $T_{1A}$, a first terminal of inductor $T_{1B}$, and a first terminal of switch $S_{1SB}$ are coupled;

a second terminal of switch $S_{1SB}$, a first terminal of inductor $T_{1C}$, and a first terminal of switch $S_{2B}$ are coupled;

a second terminal of inductor $T_{1C}$ is coupled to a first output terminal;

a first terminal of capacitor $C_2$ and a second terminal of inductor $T_{1B}$ are coupled;

a second terminal of capacitor $C_2$, a second terminal of switch $S_{2B}$ are coupled to a second output terminal.

21. The DC-DC converter of claim 20, further comprising an inductor $T_{1D}$, wherein a first terminal of inductor $T_{1D}$ is coupled to the first terminal of inductor $T_{1C}$, and a second terminal of inductor $T_{1D}$ is coupled to the second terminal of inductor $T_{1C}$.

22. The DC-DC converter of claim 20, further comprising a capacitor C1 and a capacitor C3; wherein:

a first terminal of capacitor $C_1$ is coupled to the first terminal of inductor $T_{1A}$ and a second terminal of capacitor C1 is coupled to the second output terminal; and a first terminal of capacitor $C_3$ is coupled to the second terminal of inductor $T_{1C}$ and a second terminal of capacitor $C_3$ is coupled to the second output terminal.

23. The DC-DC converter of claim 20, wherein the first output terminal is coupled to a load.

24. The DC-DC converter of claim 20, further comprising a commutation matrix coupled to the second terminal of inductor $T_{1A}$, the first terminal of inductor $T_{1C}$, and the second output terminal.

25. The DC-DC converter of claim 20, further comprising a controller configured to provide a signal to switch $S_{1SB}$.

* * * * *

UNITED STATES PATENT AND TRADEMARK OFFICE
CERTIFICATE OF CORRECTION

PATENT NO.       : 7,777,458 B2
APPLICATION NO.  : 12/291993
DATED            : August 17, 2010
INVENTOR(S)      : Barthold It is certified that error appears in the above-identified patent and that said Letters Patent is hereby corrected as shown below:

Replace FIG 2A with the drawing below:

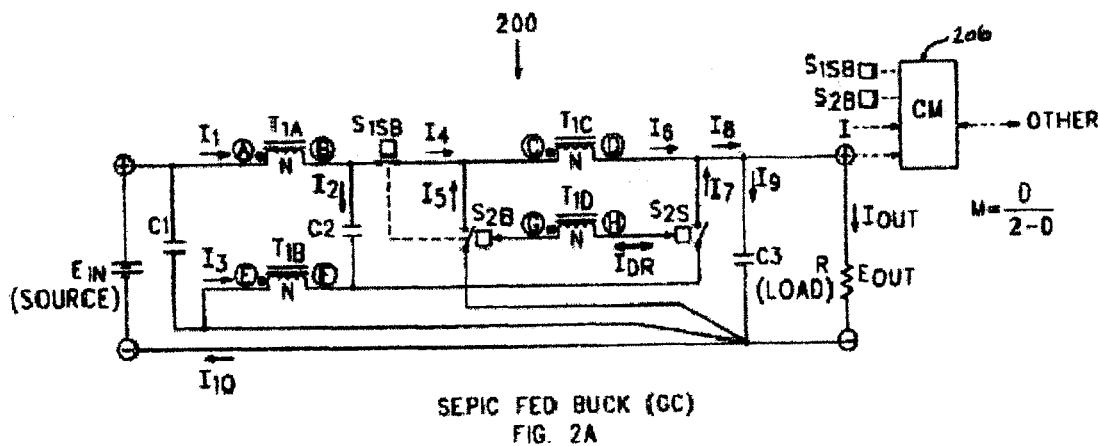

Signed and Sealed this
Seventh Day of June, 2011

David J. Kappos
*Director of the United States Patent and Trademark Office*